(12) United States Patent
Sengoku

(10) Patent No.: US 9,710,412 B2
(45) Date of Patent: Jul. 18, 2017

(54) N-FACTORIAL VOLTAGE MODE DRIVER

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 14/278,682

(22) Filed: May 15, 2014

(65) Prior Publication Data

US 2015/0331820 A1 Nov. 19, 2015

(51) Int. Cl.
*H04L 25/02* (2006.01)
*G06F 13/38* (2006.01)
*H04L 5/20* (2006.01)

(52) U.S. Cl.
CPC ............. *G06F 13/385* (2013.01); *H04L 5/20* (2013.01); *H04L 25/028* (2013.01); *H04L 25/0272* (2013.01); *H04L 25/0278* (2013.01)

(58) Field of Classification Search
CPC ......................... H04L 25/0272; H04L 25/0278
USPC .................. 710/105, 106, 305; 375/286, 295
See application file for complete search history.

(56) References Cited

U.S. PATENT DOCUMENTS

| | | | |
|---|---|---|---|
| 6,005,895 A * | 12/1999 | Perino et al. | 375/288 |
| 6,359,931 B1 * | 3/2002 | Perino et al. | 375/257 |
| 6,556,628 B1 * | 4/2003 | Poulton et al. | 375/257 |
| 7,167,527 B1 * | 1/2007 | Park et al. | 375/295 |
| 7,227,382 B1 | 6/2007 | Talbot et al. | |
| 7,358,869 B1 | 4/2008 | Chiarulli et al. | |
| 8,208,578 B2 * | 6/2012 | Franzon et al. | 375/288 |
| 8,633,733 B2 | 1/2014 | Dettloff et al. | |
| 2002/0186777 A1 | 12/2002 | Perino et al. | |
| 2009/0225873 A1 * | 9/2009 | Lee et al. | 375/257 |
| 2010/0215118 A1 * | 8/2010 | Ware et al. | 375/295 |
| 2010/0235673 A1 * | 9/2010 | Abbasfar | 713/500 |
| 2011/0133773 A1 | 6/2011 | Shau | |

(Continued)

FOREIGN PATENT DOCUMENTS

WO WO-2014138658 A1 9/2014

OTHER PUBLICATIONS

International Search Report and Written Opinion—PCT/US2015/030227—ISA/EPO—Jul. 22, 2013.

(Continued)

*Primary Examiner* — Glenn A Auve
(74) *Attorney, Agent, or Firm* — Loza & Loza LLP

(57) ABSTRACT

System, methods and apparatus are described that provide an N-factorial (N!) voltage-mode driver. A method communicating on an N! interface includes encoding data in a symbol to be transmitted over the N wires of the interface, and for each wire of the N wires, calculating a resultant current for the wire by summing current flows defined for two or more two-wire combinations that include the wire, and coupling a switchable voltage source to the each wire. Each bit in the symbol defines a current flow between a pair of the N wires that is one of a plurality of possible two-wire combinations of the N wires. The switchable voltage source may be selected from a plurality of switchable voltage sources in order to provide a current in the each wire that is proportionate to the resultant current calculated for the each wire.

26 Claims, 17 Drawing Sheets

(56) References Cited

U.S. PATENT DOCUMENTS

2013/0194005 A1    8/2013  Voutilainen et al.
2014/0254711 A1*   9/2014  Sengoku et al. .............. 375/295

OTHER PUBLICATIONS

Poulton J W., et al., "Multiwire Differential Signaling", Aug. 6, 2003 No. 1.1 Aug. 6, 2003 {Aug. 6, 2003), pp. 1-20, XP002610849, Retrieved from the Internet: URL:http://www.cs.unc.eduf-jpfmwire.pdf [retrieved on Nov. 23, 2010] the whole document.

\* cited by examiner

N-FACTORIAL VOLTAGE MODE DRIVER

BACKGROUND

Field

The present disclosure relates generally to an interface between processors and a peripheral devices and, more particularly to voltage mode drivers for transmitting multi-wire, multi-level differential signals over a plurality of conductors.

Background

In multi-signal data transfer, differential signaling is sometimes used to transmit information. For example, an N-factorial (N!) communications interface may be configured using a termination network such that differential signals may be transmitted on each of a plurality of different pairs of N wires or connectors available for communication between devices. The termination network has N termination impedances, which are typically resistive, and each termination impedance couples its corresponding wire to a center, null point of the termination network. The current flows attributable to each N! differential driver cancel at the null point, and the signaling state of each wire may be expressed as a signaling voltage and determined as a product of the sum of currents flowing in the wire and the termination impedance couple to the wire as observed at a receiver.

In certain implementations of an N! interface, the use of current sources in an N! differential driver may be disadvantageous, including in devices that employ higher frequency signaling or that are subjected to limited power budgets.

SUMMARY

Embodiments disclosed herein provide systems, methods and apparatus that provide improvements related to certain aspects of an N! interface. In one example, combination voltage mode drivers may be configured such that one combination voltage mode driver drives each wire of the N! interface.

In an aspect of the disclosure, a method of data communications includes encoding data in a symbol to be transmitted over N wires of a communications interface, calculating a resultant current flow for each wire of the N wires, and coupling a set of voltage sources to the N wires. The symbol defines a current flow for each two-wire combination of the N wires, and the resultant current flow may be calculated as a sum of current flows defined by the symbol for two-wire combinations of the N wires that include the each wire. The set of voltage sources emulates an effect of the resultant current flow in each of the N wires while matching characteristic impedances of each of the N wires.

In another aspect, each wire of the N wires is coupled by a terminating impedance to a center-point in a termination network. The set of voltage sources may be selected such that resultant currents in the N wires cancel at the center-point in the termination network. Each wire of the N wires may be coupled to a single voltage source through an impedance that matches the terminating impedance.

In another aspect, the set of voltage sources may be coupled to the N wires by activating switches that connect each of the N wires to a corresponding voltage source that has a voltage level operable to produce the resultant current calculated for the wire. A plurality of voltage sources may be available for connection to each wire. Each of the plurality of voltage sources may have a voltage level different from the other voltage sources in the plurality of voltage sources.

In another aspect, a bit in the symbol defines a direction of the current flow for each two-wire combination. The current flow for each two-wire combination flows in opposite directions in first and second wires of the each two-wire combination.

In another aspect, the current flow for each two-wire combination is equivalent to a differential current flow produced by a differential line driver coupled to the two-wire combination. Each wire is included in N−1 two-wire combinations. The symbol may define $_NC_2$ current flows.

In an aspect of the disclosure, an apparatus that is configured to transmit data on an N! interface includes control logic, a plurality of voltage sources, and a plurality of switches. Each switch may be operable or operated to couple a corresponding one of the plurality of voltage sources through an impedance to one of N wires in the N! interface. The control logic may be configured to calculate a resultant current flow for each wire of the N wires, and activate N switches such that one voltage source is coupled to each of the N wires. The resultant current flow for each wire may be calculated as a sum of current flows defined by a symbol for each two-wire combination of the N wires that includes the each wire. The symbol encodes data to be transmitted over the N! interface in a combination of current flows provided in two-wire combinations of the N wires. A set of voltage sources may be selected for coupling to the N wires such that an effect of the resultant current flow in each of the N wires is emulated.

In another aspect, each wire of the N wires is coupled by a terminating impedance to a center-point in a termination network. The set of voltage sources may be selected such that resultant currents in the N wires cancel at the center-point in the termination network. Each wire of the N wires may be coupled to a single voltage source through an impedance that matches the terminating impedance.

In another aspect, a plurality of voltage sources is available for connecting to each of the N wires. Each of the plurality of voltage sources may have a voltage level different from the other voltage sources in the plurality of voltage sources.

In another aspect, a bit in the symbol defines a direction of the current flow for each two-wire combination. The current flow for each two-wire combination flows in opposite directions in first and second wires of the each two-wire combination. The current flow for each two-wire combination may be equivalent to a differential current flow produced by a differential line driver coupled to the each two-wire combination. Each wire may be included in N−1 two-wire combinations. The symbol may define $_NC_2$ current flows.

In an aspect of the disclosure, an apparatus includes means for encoding data in a symbol to be transmitted over N wires of a communications interface, means for calculating a resultant current flow for each wire of the N wires, and means for coupling a set of voltage sources to the N wires. The symbol may define a current flow for each two-wire combination of the N wires. The resultant current flow may be calculated as a sum of current flows defined by the symbol for two-wire combinations of the N wires that include the wire. The set of voltage sources may emulate an effect of the resultant current flow in each of the N wires while matching characteristic impedances of each of the N wires.

In an aspect of the disclosure, a processor-readable storage medium stores or maintains one or more instructions. The storage medium may be a non-transitory storage medium. The instructions may be executed by at least one processing circuit, and the instructions may cause the at least one processing circuit to encode data in a symbol to be transmitted over N wires of a communications interface, calculate a resultant current flow for each wire of the N wires, and couple a set of voltage sources to the N wires. The symbol may define a current flow for each two-wire combination. The resultant current flow can be calculated as a sum of current flows defined by the symbol for two-wire combinations of the N wires that include the each wire. The set of voltage sources may emulate an effect of the resultant current flow in each of the N wires while matching characteristic impedances of each of the N wires.

DETAILED DESCRIPTION

Figure 1:
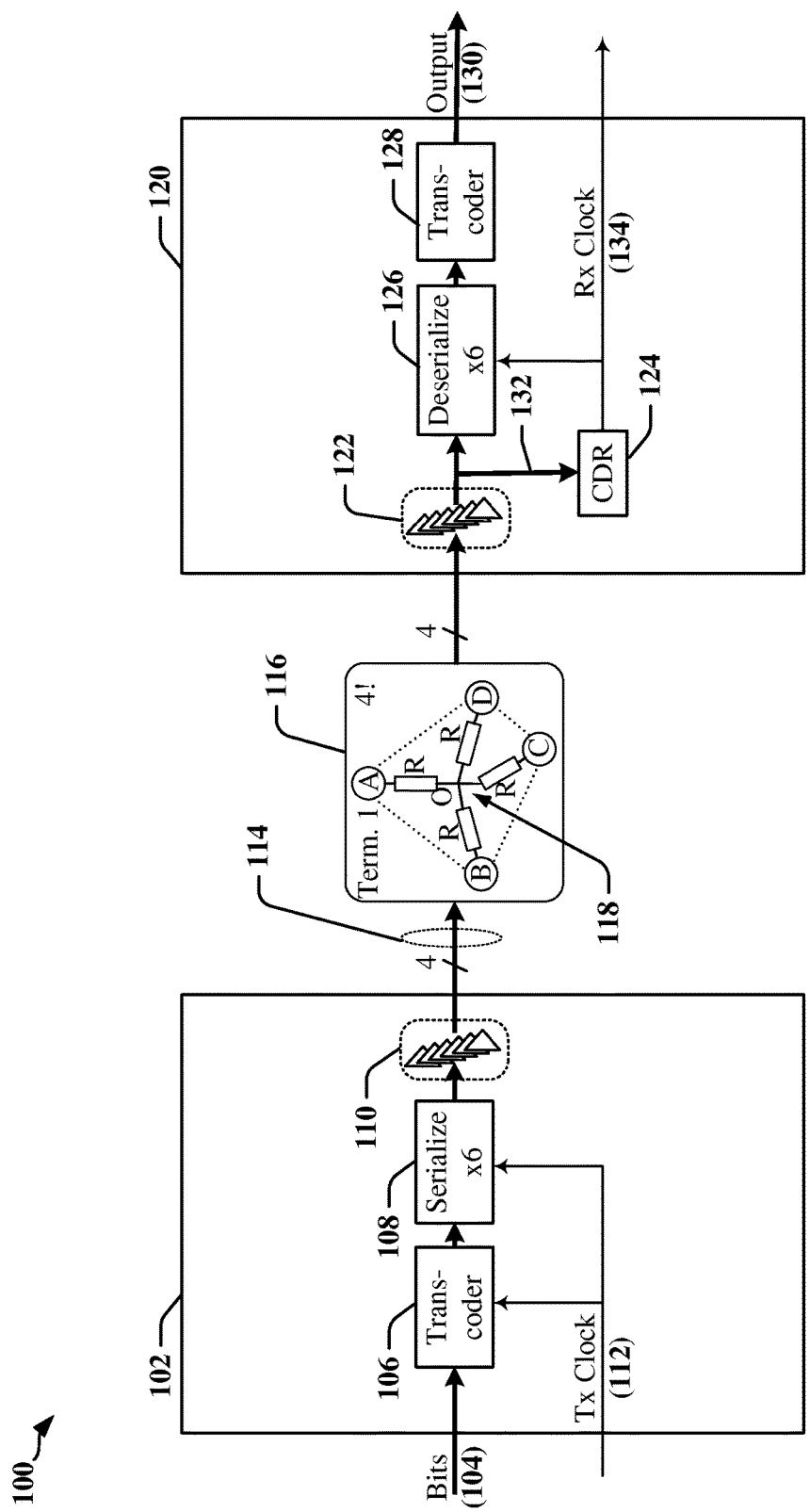
FIG. 1 illustrates an example of a basic N! multi-wire interface.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device.

FIG. 1 is a diagram illustrating an example of N! encoding used on an N-wire interface 100 provided between two devices 102 and 120. At a transmitter 102, a transcoder 106 may be used to encode data 104 and clock information in symbols to be transmitted over a set of N wires 114. The clock information may be derived from a transmit clock 112 and may be encoded in a sequence of symbols transmitted in $_NC_2$ differential signals over the N wires 114 by ensuring that a signaling state transition occurs on at least one of the $_NC_2$ signals between consecutive symbols. When N! encoding is used to drive the N wires 114, each bit of a symbol is transmitted as a differential signal by one of a set of differential line drivers 110, where the differential drivers in the set of line drivers 110 are coupled to different pairs of the N wires 114. Each wire of the N wires 114 may be paired with each of the other N−1 wires in the N wires 114, and the number of available combinations of wire pairs ($_NC_2$) determines the number of signals that can be transmitted over the N wires 114. The number of data bits 104 that can be encoded in a symbol may be calculated based on the number of available signaling states available for each symbol transmission interval.

A termination impedance (typically resistive) couples each of the N wires 114 to a common center point 118 in a termination network 116. It will be appreciated that the signaling state of the N wires 114 reflects a combination of the currents in the termination network 116 attributed to the differential drivers 110 coupled to each wire. It will be further appreciated that the center point 118 is a null point, whereby the currents in the termination network 116 cancel each other at the center point 118.

The N! encoding scheme need not use a separate clock channel and/or non-return-to-zero decoding because at least one of the $_NC_2$ signals in the link transitions between consecutive symbols. Effectively, the transcoder 106 ensures that a transition occurs between each pair of symbols transmitted on the N wires 114 by producing a sequence of symbols in which each symbol is different from its immediate predecessor symbol. In the example depicted in FIG. 1, four wires are provided (N=4), and the 4 wires can carry $_4C_2$=6 differential signals. The transcoder 106 may employ a mapping scheme to generate raw symbols for transmission on the N wires 114. The transcoder 106 may map data bits 104 to a set of transition numbers. The transition numbers may be used to select raw symbols for transmission based on the value of the immediately preceding symbol such that the selected raw symbol is different from the preceding raw symbol. The raw symbols may be serialized by the serializers 108 to obtain a sequence of symbols for transmission over the N-wires 114. In one example, a transition number may be used to lookup a data value corresponding to the second of the consecutive raw symbols with reference to the first of the consecutive raw symbols. At the receiver 120, a transcoder 128 may employ a mapping to determine a transition number that characterizes a difference between a pair of consecutive raw symbols, using a lookup table for example. The transcoders 106, 128 operate on the basis that every consecutive pair of raw symbols includes two different symbols.

The transcoder 106 at the transmitter 102 may select between N!−1 available signaling states at every symbol transition. In one example, a 4! system provides 4!−1=23 signaling states for the next symbol to be transmitted at each symbol transition. The bit rate may be calculated as $\log_2$(available_states) per transmit clock cycle.

According to certain aspects disclosed herein, dual data rate (DDR) signaling may be employed to increase the interface bandwidth by transmitting two symbols in each period of the transmit clock 112. Symbol transitions occur at both the rising edge and falling edge of the transmit clock in a system using double data rate (DDR) clocking. The total available states in the transmit clock cycle is $(_NC_2−1)^2=(23)^2=529$ and the number of data bits 104 that can transmitted per symbol may be calculated as $\log_2 (529)=9.047$ bits.

A receiving device 120 receives the sequence of symbols using a set of line receivers 122 where each receiver in the set of line receivers 122 determines differences in signaling states on one pair of the N wires 114. Accordingly, $_NC_2$ receivers 122 are used, where N represents the number of wires. The $_NC_2$ receivers 122 produce a corresponding number of raw symbols as outputs. In the depicted 4-wire example, the signals received on the 4 wires 114 are processed by 6 receivers ($_4C_2$=6) to produce a raw symbol signal 132 that is provided to a clock and data recovery (CDR) circuit 124 and deserializers 126. The raw symbol signal 132 is representative of the signaling state of the N wires 114, and the CDR circuit 124 may process the raw symbol signal 132 to generate a receive clock signal 134 that can be used by the deserializer 126.

The receive clock signal 134 may be a DDR clock signal that can be used by external circuitry to process received data 130 provided by the transcoder 128. The transcoder 128 decodes a block of received symbols from the deserializer 126 by comparing each symbol to its immediate predecessor. The transcoder 128 produces as output, received data 130 corresponding to the data bits 104, provided to the transmitter 102.

Figure 2:
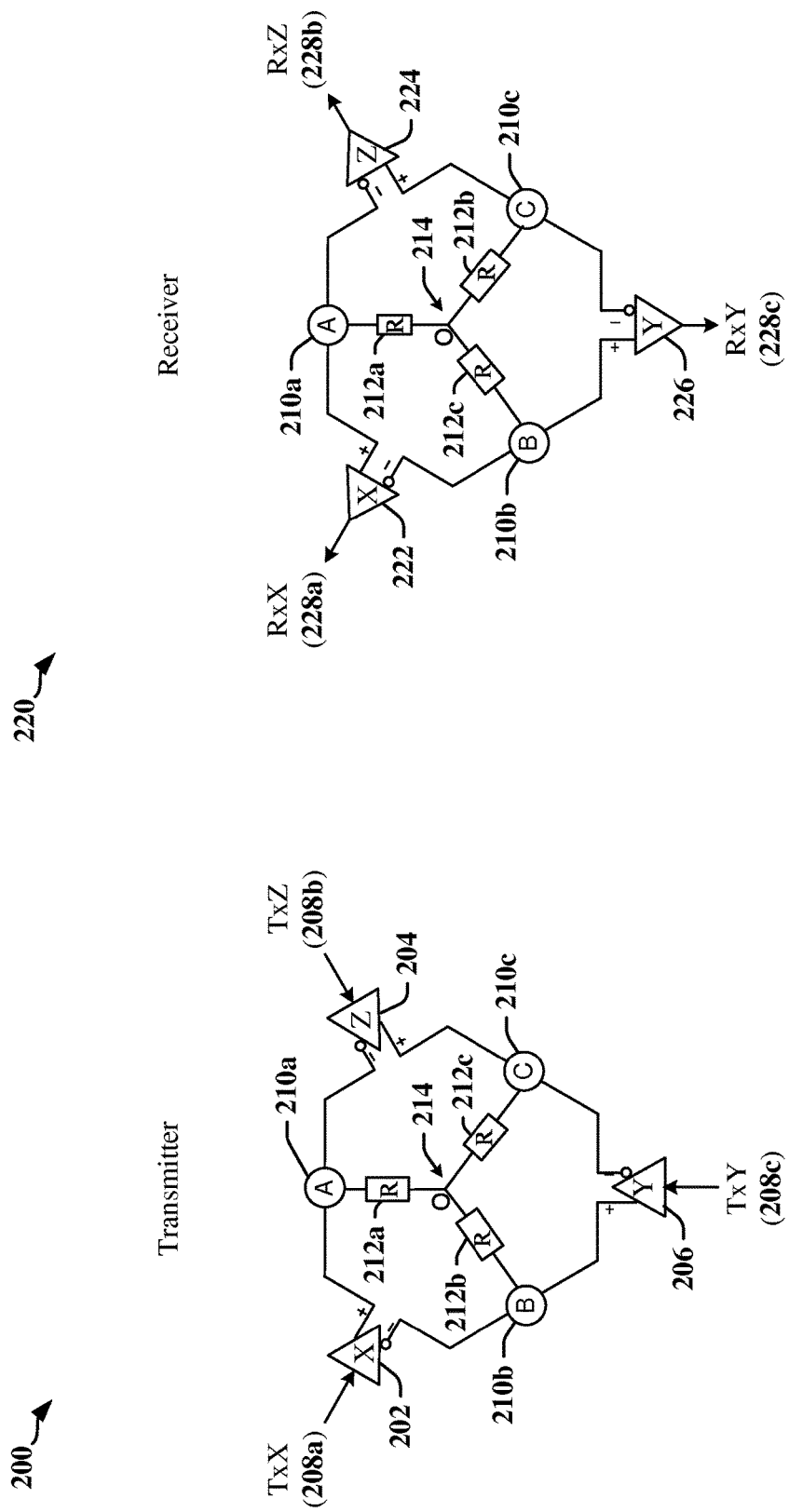
FIG. 2 illustrates an example of a termination network employed in a 3-wire, 3! communications interface.

FIG. 2 illustrates an example of a termination network employed in a 3-wire, 3! communications interface, where one view of the termination network is provided from the perspective of a transmitter 200, and another view of the termination network is provided from the perspective of a receiver 220. The termination network includes three resistors 212a, 212b and 212c having a value of R Ω, and which couple the network terminals 210a, 210b and 212c, respectively, to a center point 214. On the transmitter side 200, differential line drivers 202, 204 and 206 drive different pairs of the three terminals 210a, 210b and 210c. Each differential line driver 202, 204, and 206 responds to its respective input signal 208a, 208b or 208c by providing a current that flows through a pair of the three resistors 212a, 212b and 212c of the termination network. Accordingly, each differential line driver 202, 204, 206 sees an impedance of 2R Ω, where R is typically chosen to match the characteristic impedance of a transmission line coupled to the termination network. The transmission line may include two wires of the 3-wire interface driven by the differential line driver 202, 204 or 206. The voltage observed by the line receivers 222, 224, 226 may be calculated based on the sum of the currents flowing through the two resistors 212a, 212b and/or 212c that span the pair of terminals 210a, 210b and/or 210c coupled to a corresponding line receiver 222, 224 or 226.

Figure 3:
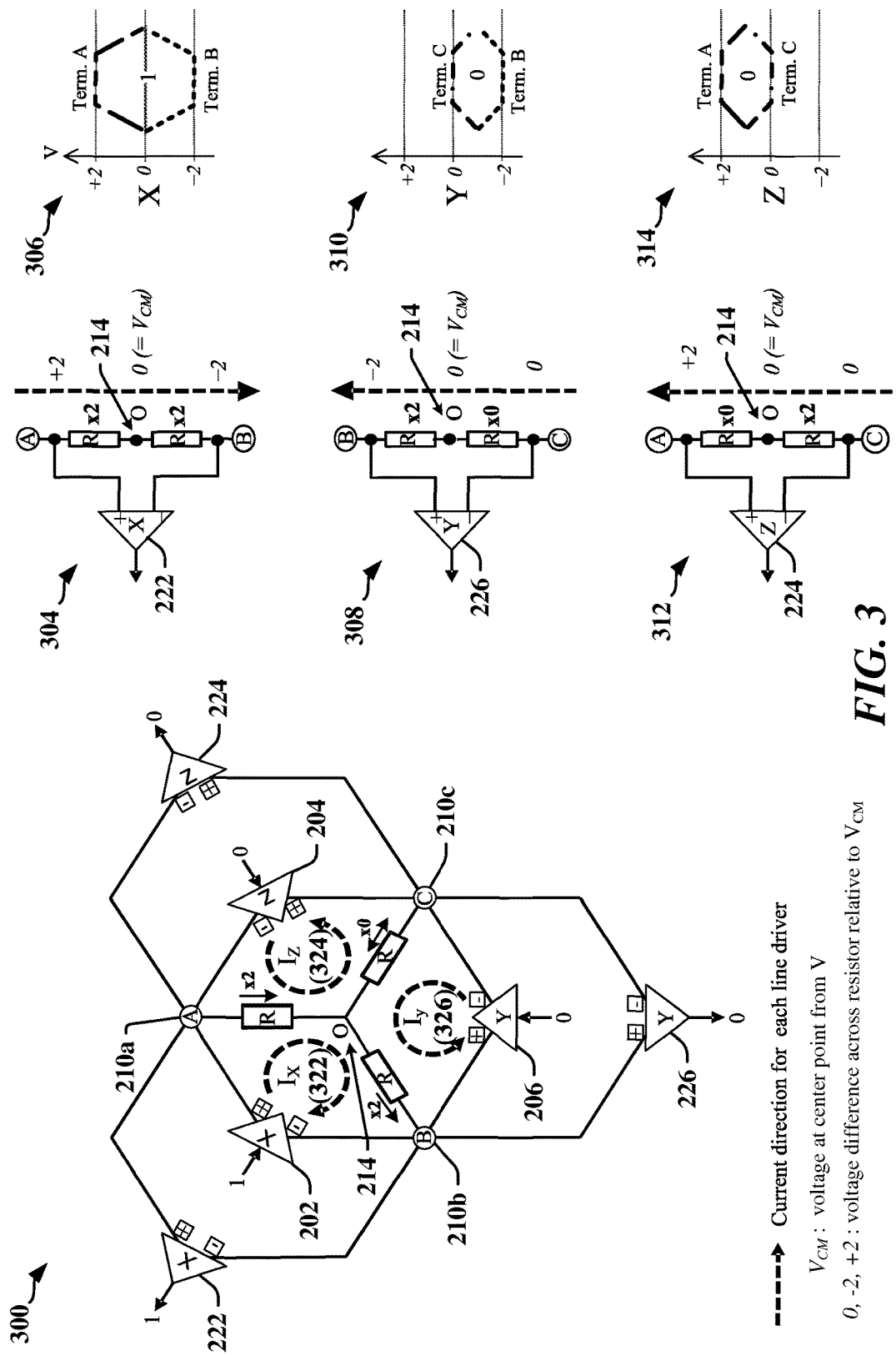
FIG. 3 illustrates an example of current flow in the termination network for the 3-wire, 3! communications interface illustrated in FIG. 2.

FIG. 3 illustrates an example of current flow in the termination network for the 3-wire, 3! communications interface illustrated in FIG. 2. FIG. 3 includes a schematic diagram 300 showing the relationship between the differential line drivers 202, 204, 206, the receivers 222, 224, 226 and the currents flowing through the resistors of the termination network. In the example, a raw symbol value of 100 is being transmitted, such that the X line driver 202 transmits the most significant bit of the raw symbol. The current 322 provided by the X line driver 202 in response to a logic '1' input flows in a first direction through the termination network from terminal A 210a to terminal B 210b. The current 326 provided by the Y line driver 206 in response to a logic '0' input flows in a second. direction through the termination network from terminal C 210c to terminal B 210b. The current 324 provided by the Z line driver 204 in response to a logic '0' input flows in the second direction through the termination network from terminal A 210a to terminal C 210c. The resultant current flowing through each resistor is calculated as the sum of two currents 322, 324 and/or 326. In each resistor, substantially no current flows or twice the current ($I_{TX}$) produced by a single differential line driver 202, 204 or 206 flows in the resistor.

As shown in isolation in the schematic drawings 304, 308 and 312, each receiving circuit 222, 224, 226 receives a voltage input from two terminals 210a, 210b and/or 210c where each voltage input reflects a voltage level that may be measured with respect to the center point 214 of the termination network. Each voltage level can be $\pm 2I_{TX}R$ Volts or 0 Volts, for example. The receiving circuits 222, 224, 226 may generate a logic '1' output state or a logic '0' output state based on the polarity of the voltage differences across a corresponding pair of the terminals 210a, 210b and/or 210c.

Figure 4:
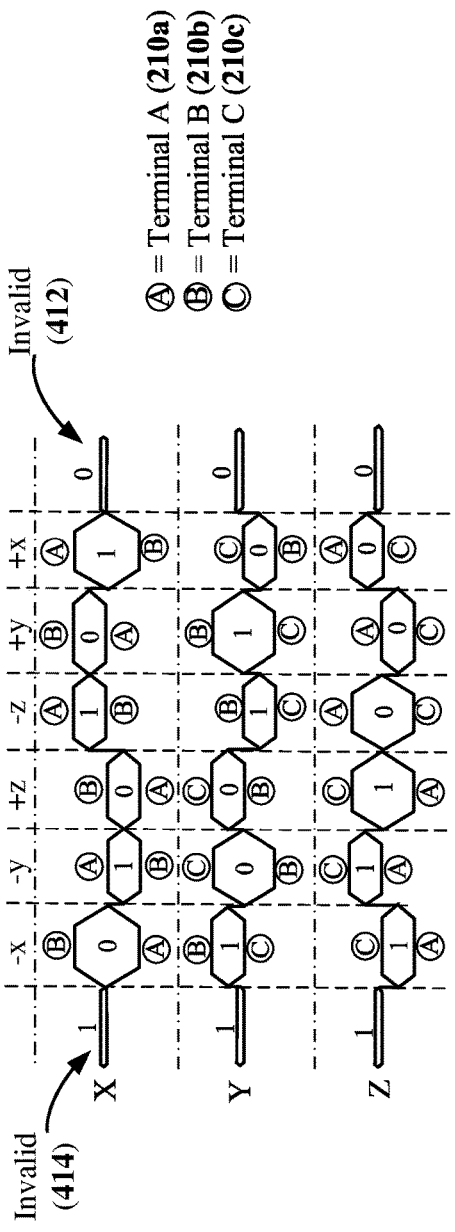
FIG. 4 illustrates certain aspects of the operation of the 3-wire, 3! communications interface illustrated in FIGS. 2 and 3.

FIG. 4 illustrates certain aspects of the operation of the 3-wire, 3! communications interface illustrated in FIGS. 2 and 3. As illustrated in the state diagram 400, six signaling states 402 of the 3 wires may be used to encode information. The signaling states 402 are defined by three bits (represented by the input signals 208a, 208b and 208c) of a raw input symbol provided to the differential line drivers 202, 204, 206 respectively. Each combination of inputs to the differential line drivers 202, 204, 206 generates a unique set of differential signals, except for the states 412, 414 when all inputs are 000 or 111. The input combinations 000 or 111 are considered invalid because they produce a zero voltage differential and cannot be distinguished from one another at a receiver. The remaining combinations of inputs may be referred to as states +x, +y, +z, −x, −y, and −z as illustrated in the Table 400.

The signaling states measurable at the 3 terminals 210a, 210b and 210c are illustrated in the graph 410. The output of a receiver 222, 224, or 226 represents the polarity difference between the two terminals 210a, 210b and/or 210c coupled to the receiver 222, 224, or 226.

In operation, the 3! interface can use a total of six (6) states: 001 (+z), 010 (+y), 100 (+x), 110 (−z), 101 (−y), 011 (−x), which are transferred over the 3 wires. Accordingly, $\log_2(6)=2.58$ bits of information can be encoded per cycle.

Figure 5:
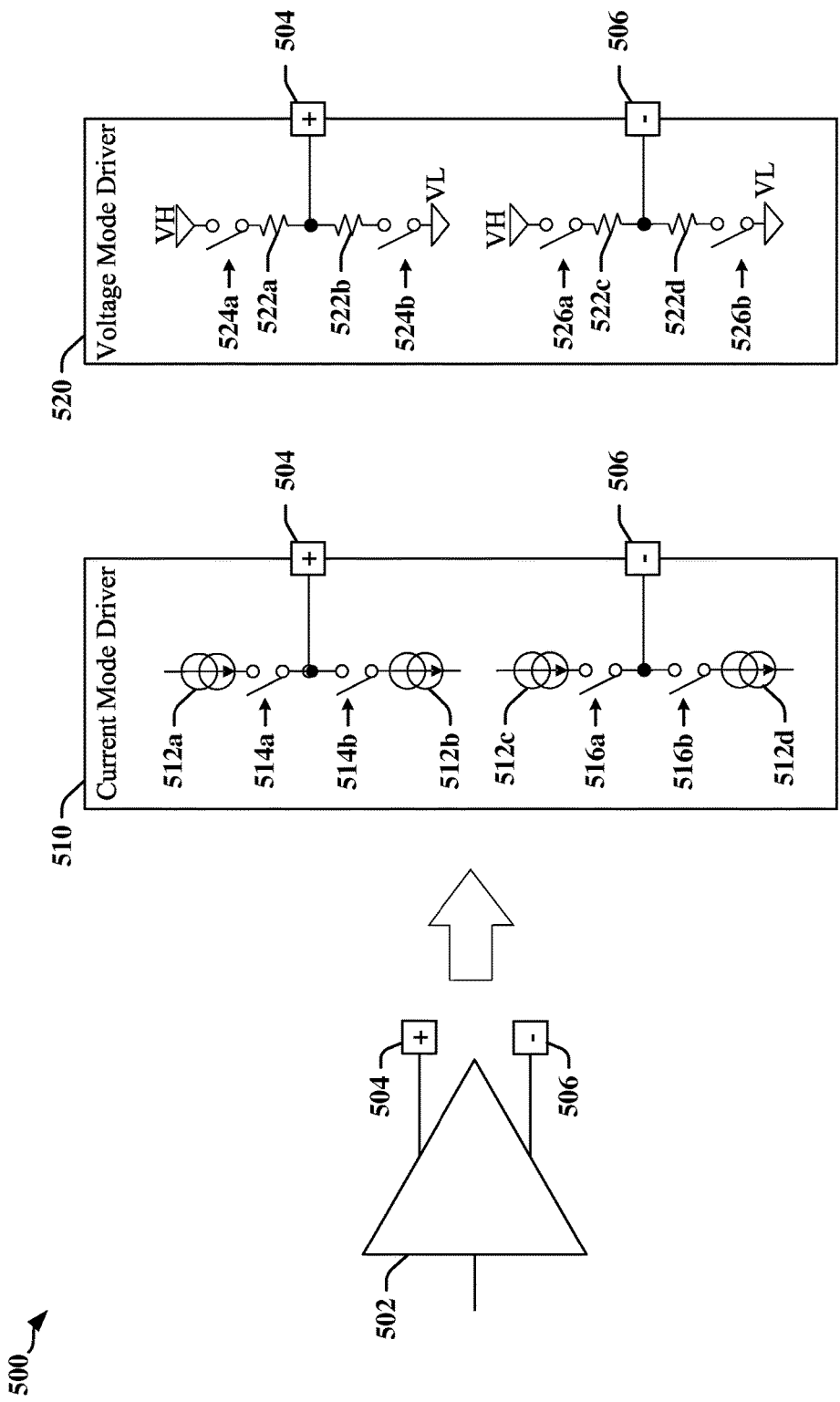
FIG. 5 illustrates examples of different types of differential drivers usable in an N! communications interface according to certain aspects disclosed herein.

FIG. 5 illustrates examples of different types of circuits 510 and 520 that may be used to implement a differential driver 502 in accordance with certain aspects disclosed herein. The differential driver 502 typically provides output terminals including a positive terminal 504 and a negative terminal 506. The differential driver 502 may be implemented as a current mode differential driver 510 or a voltage mode differential driver 520, with the positive terminal 504 and the negative terminal 506 being driven separately.

In one example, a current mode driver 510 provides a pair of switches 514a, 514b that selects between a current source 512a and a current sink 512b to generate a current flow in a desired direction through the positive terminal 504, while a pair of switches 516a, 516b selects between a current source 512c and a current sink 512d to generate a current flow in a desired direction through the negative terminal 506. Typically, the switches 514a and 514b are controlled by logic such that one switch 514a or 514b is open while the other switch 514b or 514a is closed. The separate driving circuits are switched high or low (i.e., push or pull) depending on the current flow desired.

In another example, a voltage mode driver 520 provides switches 524a and 524b that are operated to couple the positive terminal 504 through respective resistors 522a or 522b to one of a high voltage level or a low voltage level, thereby providing a current flow in a desired direction through the positive terminal 504, while switches 526a and 526b that are operated to couple the negative terminal 506 through respective resistors 522c or 522d to one of a high voltage level or a low voltage level, thereby providing a current flow in a desired direction through the negative terminal 506. Typically, the switches 524a, 524b, 526a, 526b are controlled by logic such that the positive terminal 504 and negative terminal 506 are coupled to opposite voltage levels for each signaling state.

Figure 6:
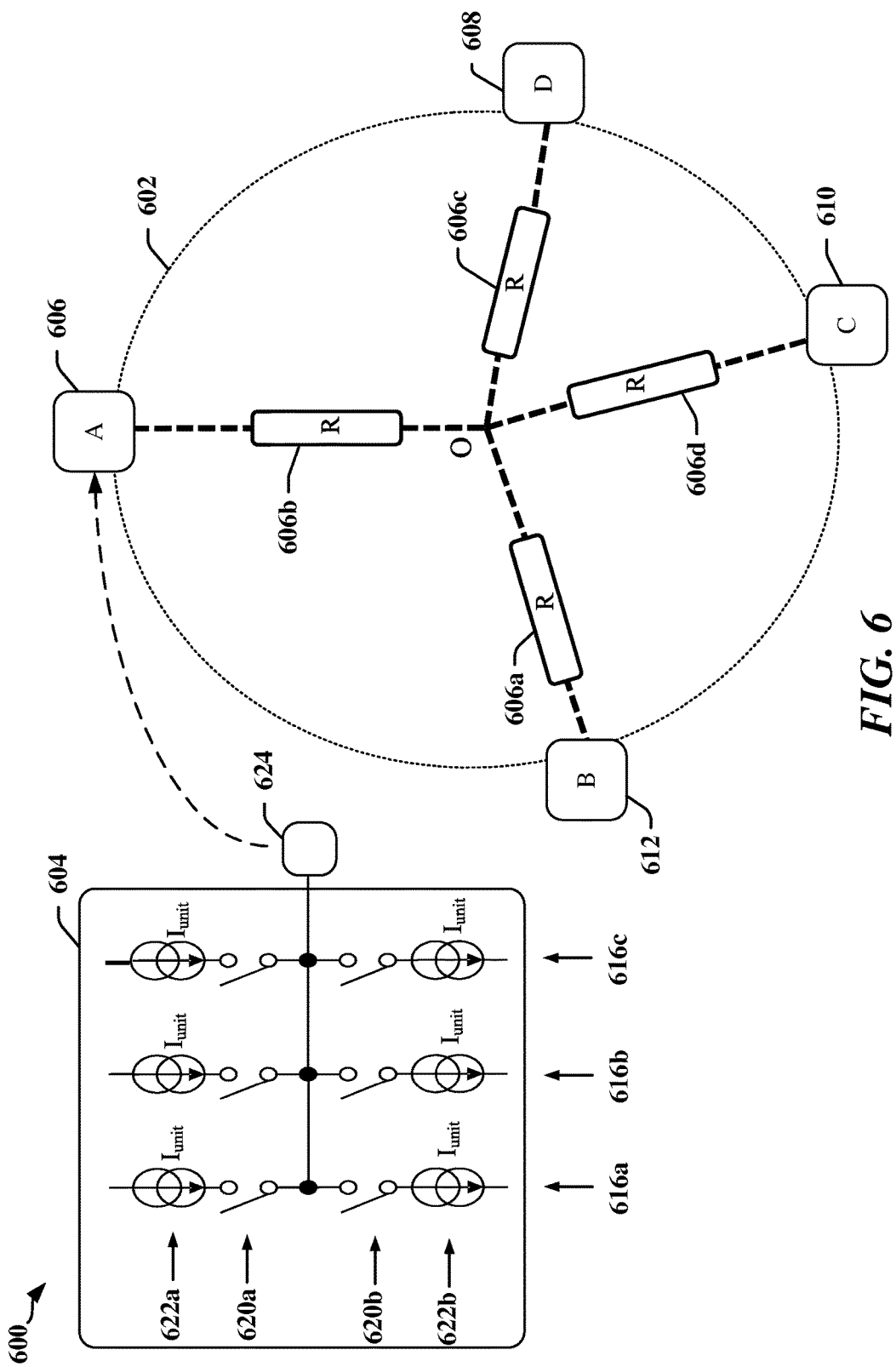
FIG. 6 illustrates a method of driving a 4! termination network 602 using a combination current-mode driver.

FIG. 6 illustrates a method of driving a 4! termination network 602 using a combination current-mode driver 604 coupled to each terminal 606, 608, 610 and 612 of the termination network. Only one combination driver 604 is shown to simplify the drawing and facilitate description of certain aspects disclosed herein. As described herein, a conventional interface that uses N! encoding transmits a differential signal over each possible pair of wires in an N wire interface, where each differential signal is controlled by one bit in each of sequence of symbols. The total number of differential signals and differential line drivers is calculated as $_NC_2$. For a 4-wire interface, $_NC_2={_4C_2}=6$. According to certain aspects disclosed herein, a set of 4 combination drivers 604 may replace the 6 differential line drivers that would otherwise be required to drive the 6 pairs of wires available in a 4! interface. Each combination driver 604 may include a plurality of separately switchable circuits that can be individually turned on and off to achieve a desired current flow in a desired direction. In the example depicted, the combination driver 604 may include three switchable circuits 616a, 616b, and 616c each providing a unitary current ($I_{unit}$).

Each of the switchable circuits 616a, 616b, and 616c may be independently controlled so that none, one, two, or three of the switchable circuits 616a, 616b, and 616c can be operational in any one cycle. The switchable circuits 616a, 616b and 616c include switches 620a that can be independently closed to couple an output of a corresponding current source 622a to the terminal 624 of the combination driver 604, thereby providing a positive current flow through the terminal 624 with a magnitude of $I_{unit}$, $2I_{unit}$, or $3I_{unit}$, based on the number of switches 620a that are closed. The switchable circuits 616a, 616b and 616c also include switches 620b that can be independently closed to couple an output of a corresponding current sink 622b to the terminal 624 of the combination driver 604, thereby providing a negative current flow through the terminal 624 with a magnitude of $I_{unit}$, $2I_{unit}$, or $3I_{unit}$, based on the number of switches 620b are closed.

The "positive" switches 620a are typically turned off or disabled when one or more of the "negative" switches 620b are turned on, and the "negative" switches 620b are typically turned off or disabled when one or more of the "positive" switches 620a are turned on. When all switches 620a and 620b are open, no current flows into or out of the terminal 624. A set of 4 combination drivers 604 may be controlled to produce a level of current in each resistor 606a-606d of the termination network 602 that is equivalent to the level of current produced by the 6 differential drivers that would otherwise be used to drive the 6 combinations of two wires in the 4 wires of a 4! interface. It will be appreciated that the use of a combination driver 604 can reduce the complexity of an N! interface, particularly for high values of N.

Figure 7:
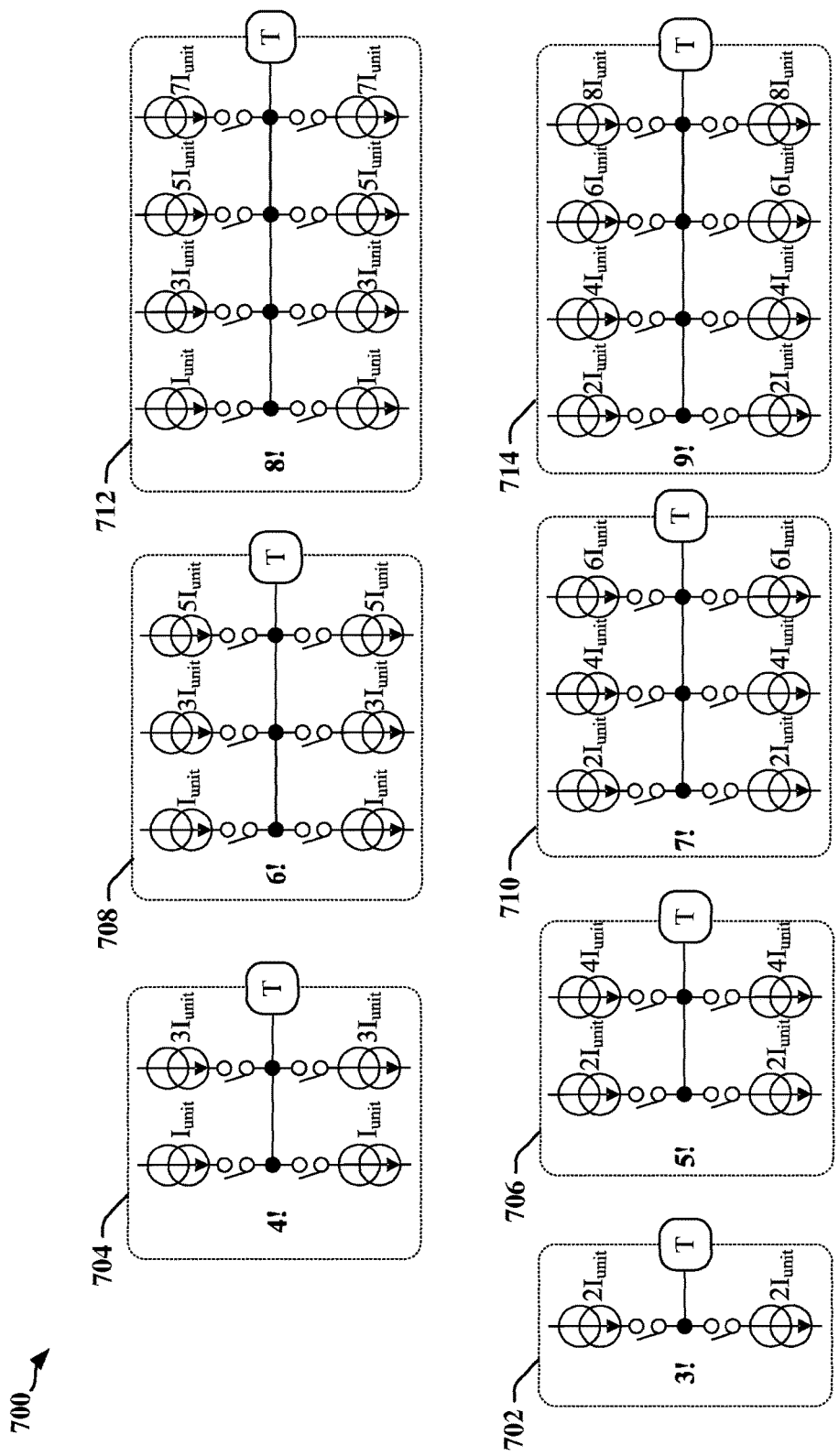
FIG. 7 illustrates examples of current mode combination drivers for N! termination networks implemented with various numbers of connectors.

FIG. 7 is a schematic diagram 700 that illustrates various examples of combination drivers 702, 704, 706, 708, 710, 712, 714 for various N! termination networks. In these examples, each combination drivers 702, 704, 706, 708, 710, 712, 714 includes multiple switchable circuits that provide various increasing current values. A first driver circuit 702 may be used, for example, with 3! differential signaling systems. A second driver circuit 704 may be used, for example, with 4! differential signaling systems. A third driver circuit 706 may be used, for example, with 5! differential signaling systems. A fourth driver circuit 708 may be used, for example, with 6! differential signaling systems. A fifth driver circuit 710 may be used, for example, with 7! differential signaling systems. A sixth driver circuit 712 may be used, for example, with 8! differential signaling systems. A seventh driver circuit 714 may be used, for example, with 9! differential signaling systems. In these exemplary driver circuits, the even N! drivers use a single $I_{unit}$ current flow circuit and one or more current flow circuits of odd-valued incremental current flow magnitudes while the odd N! drivers use one or more $2 \times I_{unit}$ current flow circuits and one or more current flow circuits of even-valued incremental current flow magnitudes.

Figure 8:
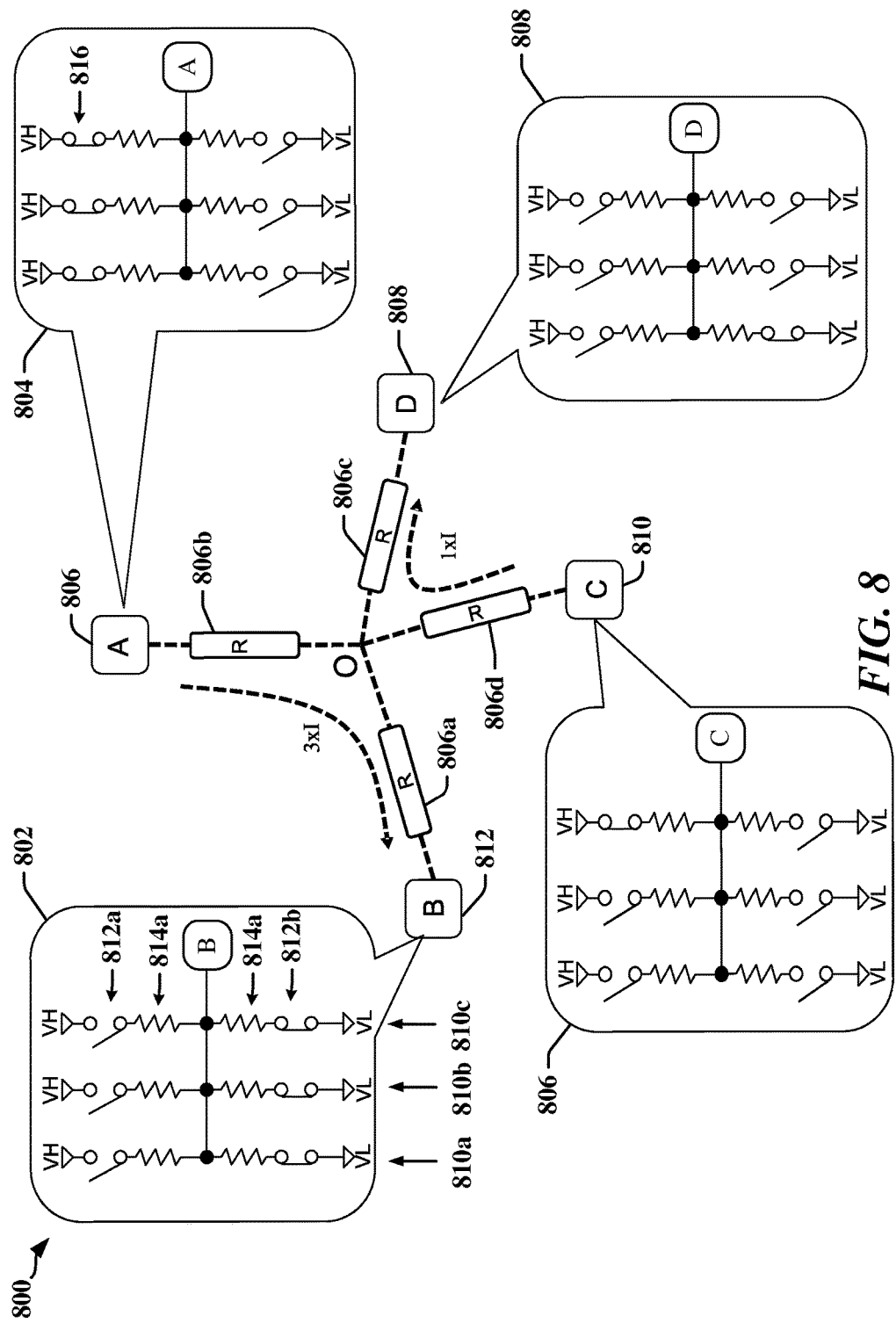
FIG. 8 illustrates the use of a first type of voltage mode combination drivers in a 4! interface.

FIG. 8 is a schematic drawing illustrating an example of the use of voltage mode combination drivers 802, 804, 806 and 808 in a 4! interface. Here, the combination driver 802, for example, may include a plurality of separately switchable circuits 810a, 810b and 810c that can be individually turned on and off to achieve a desired current flow in a desired direction through the terminal 812. In the example depicted, the combination driver 802 may include three switchable circuits 810a, 810b and 810c each capable of a unitary current ($I_{unit}$) calculated as $I_{unit}=V_H/R_{dr}$, where $R_{dr}$ is the value of the driver resistances 814a, 814b. The magnitude and direction of the current may be selected by controlling the switches 812a and 812b. However, the combination driver 802 can be the source of certain signaling issues and give rise to reflections and can degrade transmitted signals in various ways.

Figure 9:
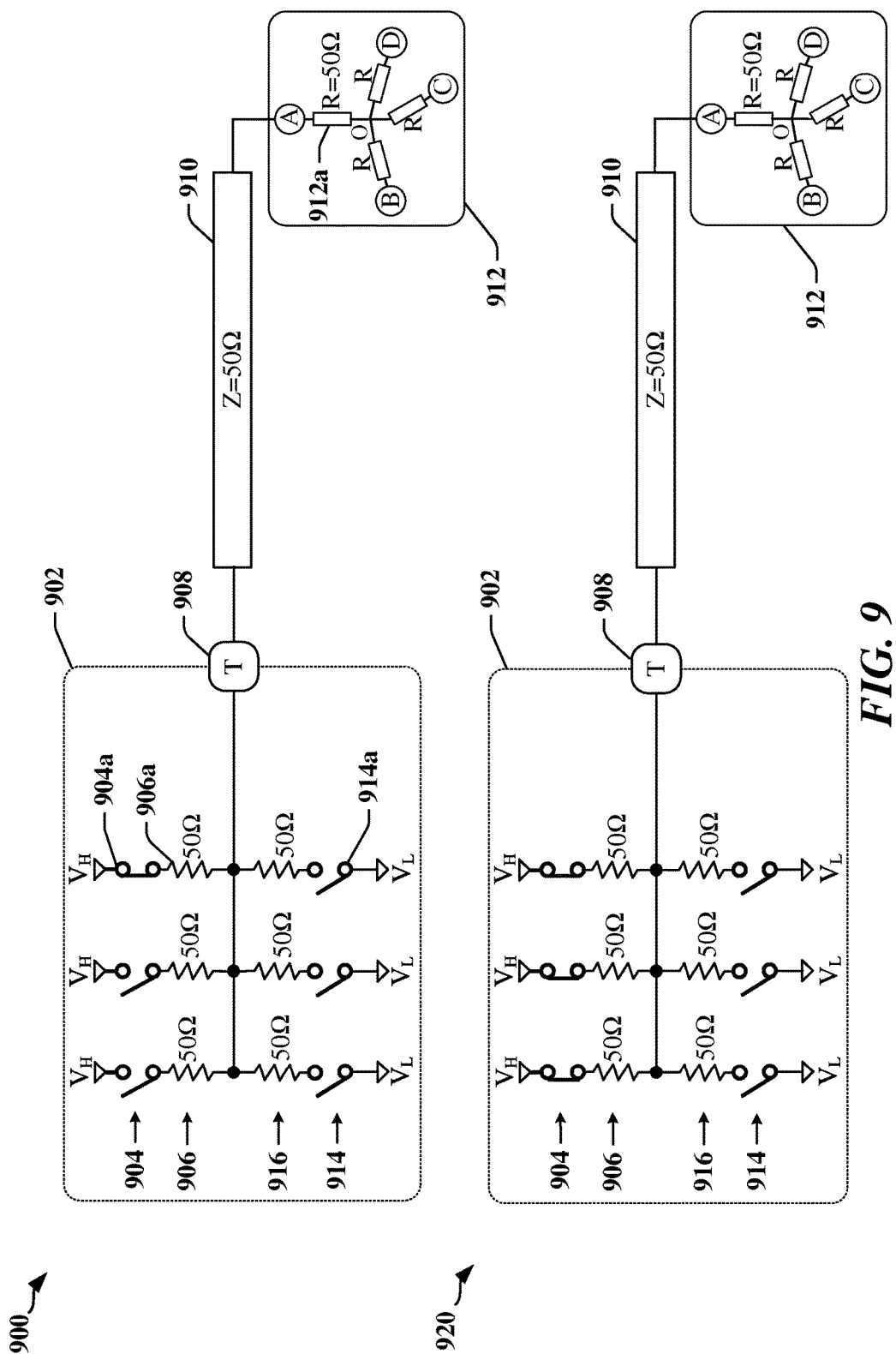
FIG. 9 illustrates certain operational aspects associated with the voltage mode combination driver of FIG. 8.

FIG. 9 illustrates certain aspects of a voltage mode combination driver 902. In the depicted examples 900 and 920, the combination driver 902 includes a first set of switches 904 and a first set of resistors 906, where each switch 904 may be selectively operated to couple a terminal 908 of the combination driver 902 to a high voltage level ($V_H$) through a corresponding resistor 906. The combination driver 902 also provides a second set of switches 914 and a second set of resistors 916, where each switch 914 may be selectively operated to couple the terminal 908 to a low voltage level ($V_L$) through a corresponding resistor 916. The terminal 908 of the combination driver 902 may be coupled to a resistor 912a of a termination network through a transmission line 910.

The transmission line 910 may have a characteristic impedance (Z), which in the depicted examples 900 and 920 is a resistance of 50Ω. Transmitters and receivers coupled to the transmission line 910 are typically provided with output or input impedances that match the 50Ω characteristic impedance of the transmission line 910. Each of the set of resistors 906, 916 may have a matching resistance value of 50Ω and the voltage levels $V_H$ and $V_L$ may be selected to provide a desired unit of current ($I_{unit}$) through each resistor 906 or 916 when a corresponding switch 904 or 914 is closed. In one example, the magnitude of the unit of current may be calculated as:

$$I_{UNIT} = \frac{(V_H - V_L)}{50 \times 4} \text{amps.}$$

Each of the set of switches 904 and 914 may be individually controlled such that, when an individual switch 904 or 914 is closed, a unit of current flows through the terminal 908, the transmission line 910 and a resistor 912a of a termination network. In the first depicted example 900, one switch 904a is closed and a unit of current ($I_H$) flows in a first direction through the transmission line 910. It will be appreciated that the unit of current would flow in a second, opposite direction if a switch 914a coupled to $V_L$ is closed rather than the switch 904a, which is coupled to $V_H$. The impedance presented by the combination driver 902 at the terminal 908 is 50 ohms, which matches the characteristic impedance of the transmission line 910. In a second example 920, three switches 904 are closed and three units of the current $I_H$ flow in the first direction through the transmission line 910. Significantly, the impedance presented by the combination driver 902 at the terminal 908 is 50/3=16.7Ω. In this example 920 the transmitter impedance does not match the characteristic impedance of the transmission line 910 and reflections and other undesired signaling effects may distort transmitted signals.

Figure 10:
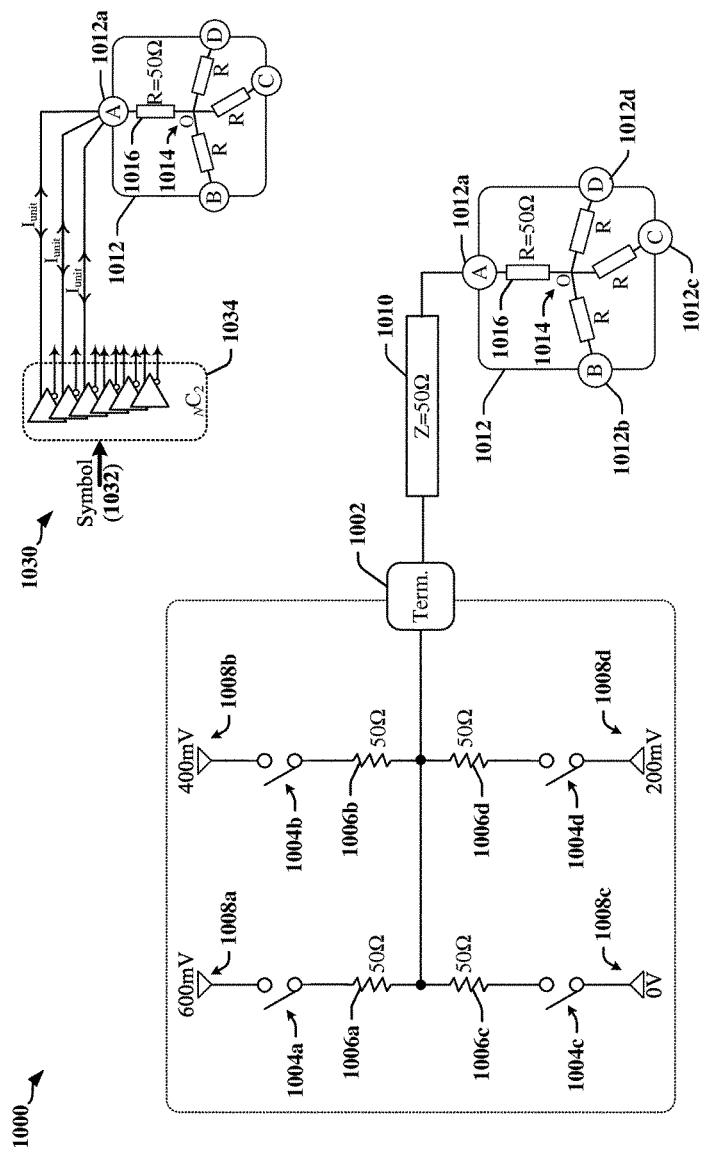
FIG. 10 illustrates certain aspects of an improved voltage mode combination driver according to certain aspects disclosed herein.

FIG. 10 is schematic diagram illustrating a voltage mode combination driver 1000 according to certain aspects disclosed herein. The combination driver 1000 may be adapted to drive a terminal 1002 coupled to a connector 1010 of an N! interface. The combination driver 1000 provides a variable current flow through the terminal 1002 and the wire or connector 1010 while maintaining a constant output impedance. In the illustrated example, the combination driver 1000 includes a plurality of switches 1004a-1004d coupled to corresponding resistors 1006a-1006d. Each switch 1004a, 1004b, 1004c or 1004d may be selectively operated to couple a terminal 1002 of the combination driver 1000 to one of a plurality of different voltage levels 1008a, 1008b, 1008c and 1008d through a corresponding resistor 1006a, 1006b, 1006c or 1006d. For each possible signaling state, only one of the switches is closed, thereby ensuring that a constant output impedance can be maintained for the combination driver 1000. In one example, the voltage levels 1008a-1008d range between 0 volts and 600 millivolts, in 200 millivolt steps.

The number of switched voltage levels 1008a, 1008b, 1008c and 1008d and their magnitudes are selected to enable N voltage mode combination drivers 1000 to emulate the operation of $_NC_2$ differential line drivers 1034 that otherwise drive the N wires of an N! interface. In the example 1030 of an N! interface that uses current mode differential drivers, each available pair of wires is driven by a differential line driver 1034, here the number of available pairs of wires is calculated as $_NC_2=_4C_2=6$. Each differential driver 1034 provides a current on two wires, where the current has the same magnitude on each wire, but flows in opposite directions. Each wire is coupled to a different terminal of the termination network 1012, and the two wires of each differential driver 1034 are coupled at the center point 1014 of the termination network 1012 through two of the four resistors provided by the termination network 1012.

Taking one terminal 1012a of the termination network 1012 as an example, three currents are provided to the terminal 1012a by three different differential receivers 1034. Each of the three currents has the same magnitude ($I_{unit}$) but may have a different direction of flow, such that each current receives $\pm I_{unit}$ from each of three differential drivers 1034. Direction of flow of the three currents is determined by one of the bits of a six-bit symbol 1032 that controls the outputs of the 6 differential receivers 1034 used in a 4! interface. The resultant current through a resistor 1016 coupled to the terminal 1012a is the sum of the three currents. In the 4! example, either all three current flow in the same direction, or two currents flow in a first direction and one current flows in the opposite direction. According, the possible current flows through the resistor 1016 are: $\pm 1 \times I_{unit} \pm 3 \times I_{unit}$. Since all current flows in the termination network are balanced, there is a zero sum current at the center point 1014 and the voltage at the center point is at the midpoint of the voltage range of the voltages observable at the terminals of the termination network 1012.

Returning to the voltage mode combination driver 1000, it can be seen that the selection of switchable voltage levels 1008a-1008d provides the ability to emulate current flow through a terminal 1012a, 1012b, 1012c or 1012d of the termination network 1012. Specifically, the switchable voltage levels 1008a-1008d ranges between 0V and 600 mV, providing a 300 mV voltage at the center point 1014 of the termination network 1012. Switchable voltage levels 1008a is +300 mV with respect to the voltage at the center point 1014, switchable voltage levels 1008b is +100 mV with respect to the voltage at the center point 1014, switchable voltage levels 1008c is −300 mV with respect to the voltage at the center point 1014 and switchable voltage levels 1008d is −100 mV with respect to the voltage at the center point 1014. This configuration of the voltage mode combination driver 1000 enables the provision of $\pm 1 \times I_{unit} \pm 3 \times I_{unit}$ to the terminal 1012a of the termination network 1012, where $I_{unit}$=1 mA.

Figure 11:
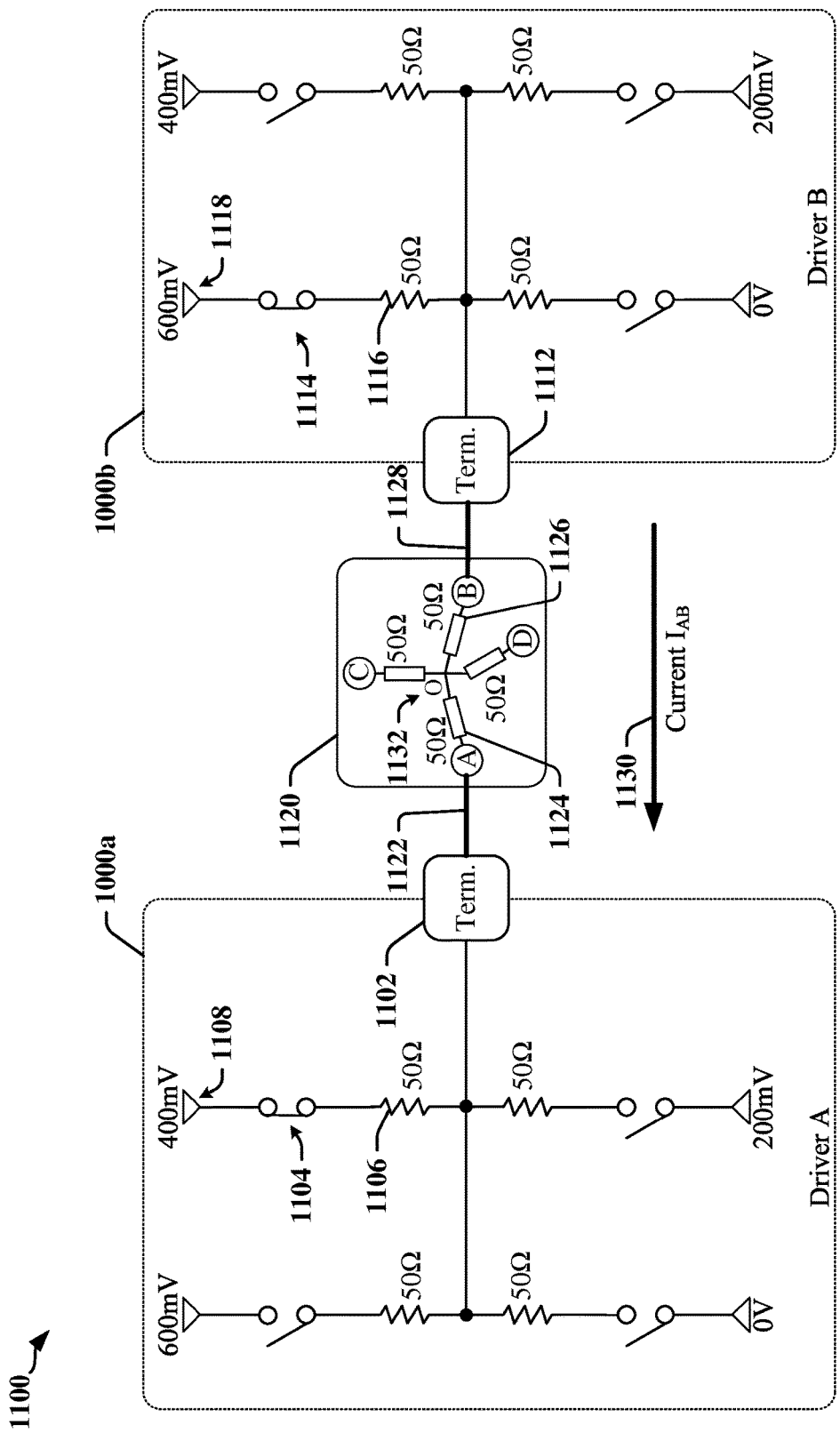
FIG. 11 illustrates the combination driver of FIG. 10 deployed in a 4! interface.

FIG. 11 is a schematic drawing 1100 illustrating certain aspects of the voltage mode combination driver 1000 when used in a 4! interface. A voltage mode combination driver may be used to drive each of the N wires of the N! interface in a manner that emulates the effect of using $_NC_2$ differential drivers to drive pairs of the N wires. A serializer 108 or transcoder 106 (see FIG. 1) may be configured or adapted to calculate values the current flows for each wire of a N! interface and these values may be used to select switches 1104, 1114 to be closed in order to transmit a current symbol. In some instances, additional logic circuits may be provided to convert raw symbols to switching values for each of a plurality of combination drivers 1000.

In FIG. 11, two combination drivers 1000a and 1000b drive two of the wires 1122, 1128 in a 4-wire communication link configured as a 4! interface. The two wires 1122, 1128 couple terminals 1102, 1112 of the respective combination drivers 1000a, 1000b to a 4! termination network 1120. The combination drivers 1000a and 1000b are operated in a manner that provides a current flow in each wire that is equivalent to the current flow that would result from transmitting a symbol over the 4 wires using $_4C_2$=6 differential drivers.

In the illustrated example, a switch 1104 of a first combination driver (Driver A) 1000a is activated in order to electrically couple a 400 mV voltage level ($V_A$) 1108 through a resistor 1106 to a terminal 1102 that is electrically coupled to a first termination resistor 1124 in the termination network 1120. A switch 1114 of a second combination driver (Driver B) 1000b is activated in order to electrically couple a 600 mV voltage level ($V_B$) 1118 through a resistor 1116 to a terminal 1112 that is electrically coupled to a second termination resistor 1126 in the termination network 1120. In the termination network 1120, the first termination resistor 1124 and the second termination resistor 1126 are electrically connected at the center null point 1132. Consequently, current flowing between the two voltage levels 1108 and 1118 is conducted through 4 resistors 1106, 1124, 1126 and 1116, each resistor having a 50Ω resistance value (R). The current ($I_{AB}$) 1130 flowing between Driver A 1000a and Driver B 1000b may be calculated as:

$$I_{AB} = \frac{V_A - V_B}{4 \times R} = \frac{(400 - 600) \text{ mV}}{4 \times 50 \text{ } \Omega} = \frac{-200 \text{ mV}}{200 \text{ } \Omega} = -1 \text{ mA}$$

The negative value of the current indicates current flow from Driver A 1000b to Driver A 1000a. It will be appreciated that the current flow between combination drivers 1000a, 100b coupled to any two terminals of the termination network 1120 may be calculated in this manner and that the total current flow to or from a combination driver 1000a or 1000b is the sum of currents calculated between any one combination driver 1000a or 1000b and the other combination drivers 1000b or 1000a coupled to the termination network 1120. Thus the combination drivers 1000a, 1000b connected to the termination network 1120 can be operated to mimic the operation of 6 differential drivers connected to the termination network 1120.

Figure 12:
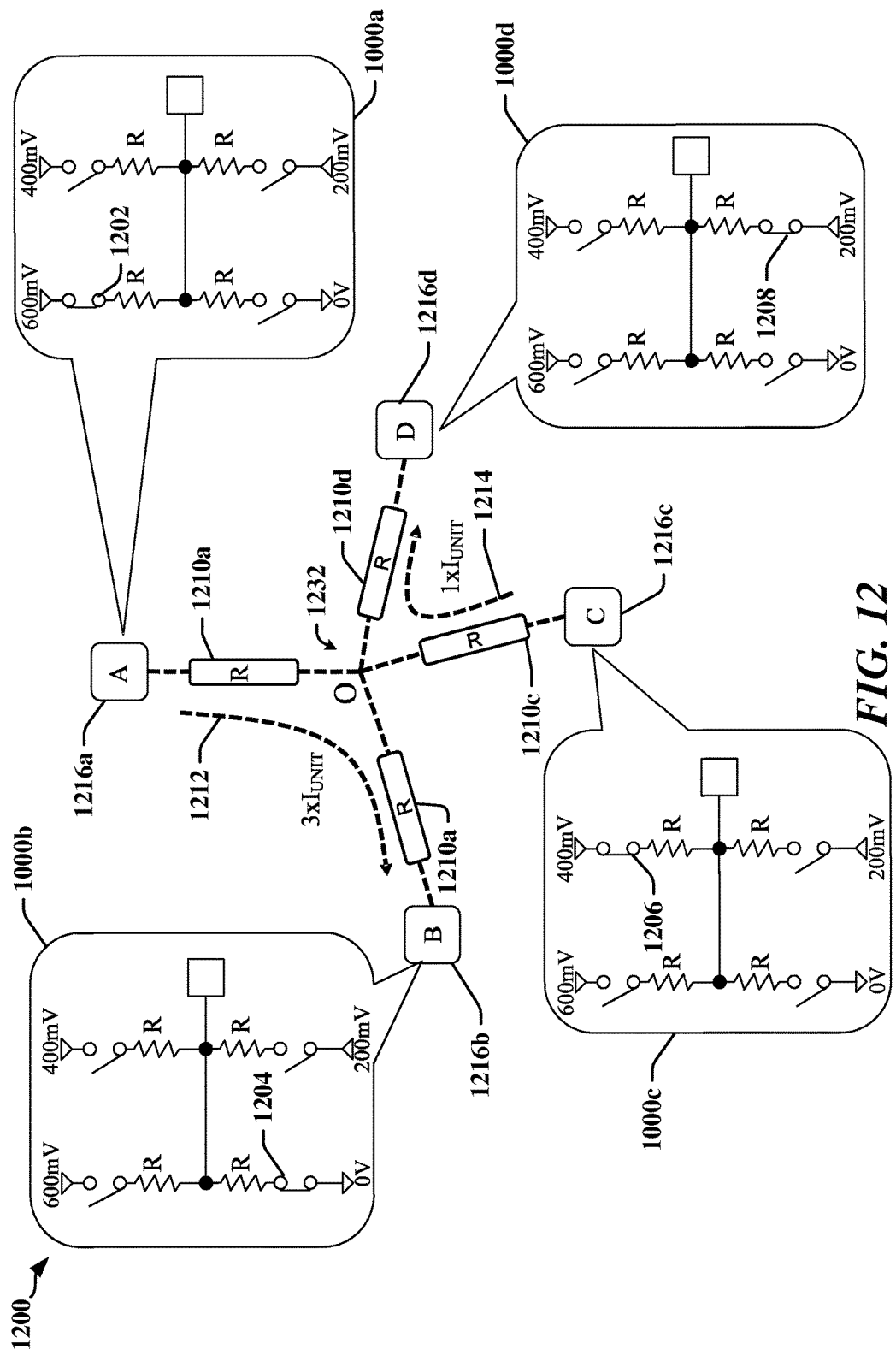
FIG. 12 illustrates the transmission of a symbol using the combination driver of FIG. 10 in a 4! interface.
Figure 13:
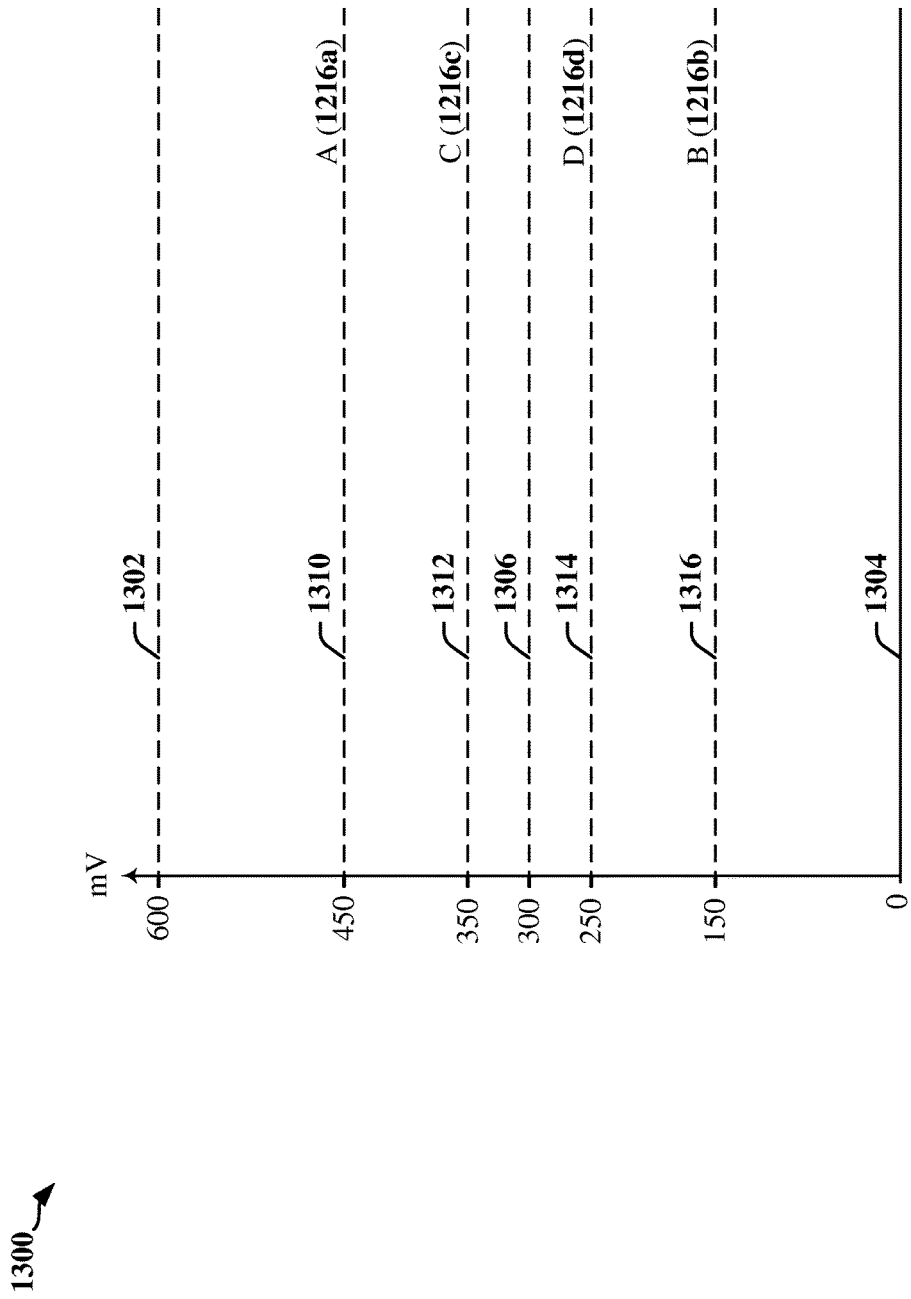
FIG. 13 is a graph illustrating voltage levels measurable during transmission of the symbol in the 4! interface of FIG. 12.

FIG. 12 is a schematic drawing 1200 illustrating the transmission of a symbol using combination drivers 1000a-1000d to drive the wires (not shown) of a 4-wire communication link configured as a 4! interface. FIG. 13 is a graph 1300 showing the voltage levels measurable in the 4! interface illustrated in FIG. 12. In the example, one switch 1202, 1204, 1206, 1208 is closed in each combination driver 1000a, 1000b, 1000c and 1000d. The closed switch 1202 in a first combination driver 1000a is coupled to a 600 mV voltage source, while the closed switch 1204 in a second combination driver 1000b is coupled to 0V. The closed switches 1206 and 1208 in third and fourth combination drivers 1000c and 1000d are coupled to 400 mV and 200 mV, respectively. The voltage at the center point 1232 is at the mid-point voltage level (300 mV) 1306 between the maximum switchable voltage level (600 mV) 1302 and the minimum switchable voltage level (0V) 1304. A three unit current ($3 \times I_{unit}$) 1212 flows between the first combination driver 1000a and the second combination driver 1000b, while a single unit current ($1 \times I_{unit}$) 1214 flows between the third combination driver 1000c and the fourth combination driver 1000d. The voltage 1310 measurable at the terminal 1216a driven by the first combination driver 1000a is 450 mV (i.e.

$$\left(\frac{3R \times 600 \text{ mV}}{4R}\right)$$

or 75% of the maximum switchable voltage level 1302), while the voltage 1316 measurable at the terminal 1216b driven by the second combination driver 1000b is 150 mV (i.e.

$$\left(\frac{R \times 600 \text{ mV}}{4R}\right)$$

or 25% of the maximum switchable voltage level 1302). The voltages 1312 and 1314 measurable at the terminals 1216c and 1216d driven by the third and fourth combination drivers 1000c and 1000d are 50 mV above or below the mid-point voltage level 1306, where the 50 mV increment is calculated as the product of $I_{unit}$ and R. Therefore, each of 6 comparators at the receiving circuit compares difference voltages of at least 100 mV.

Figure 14:
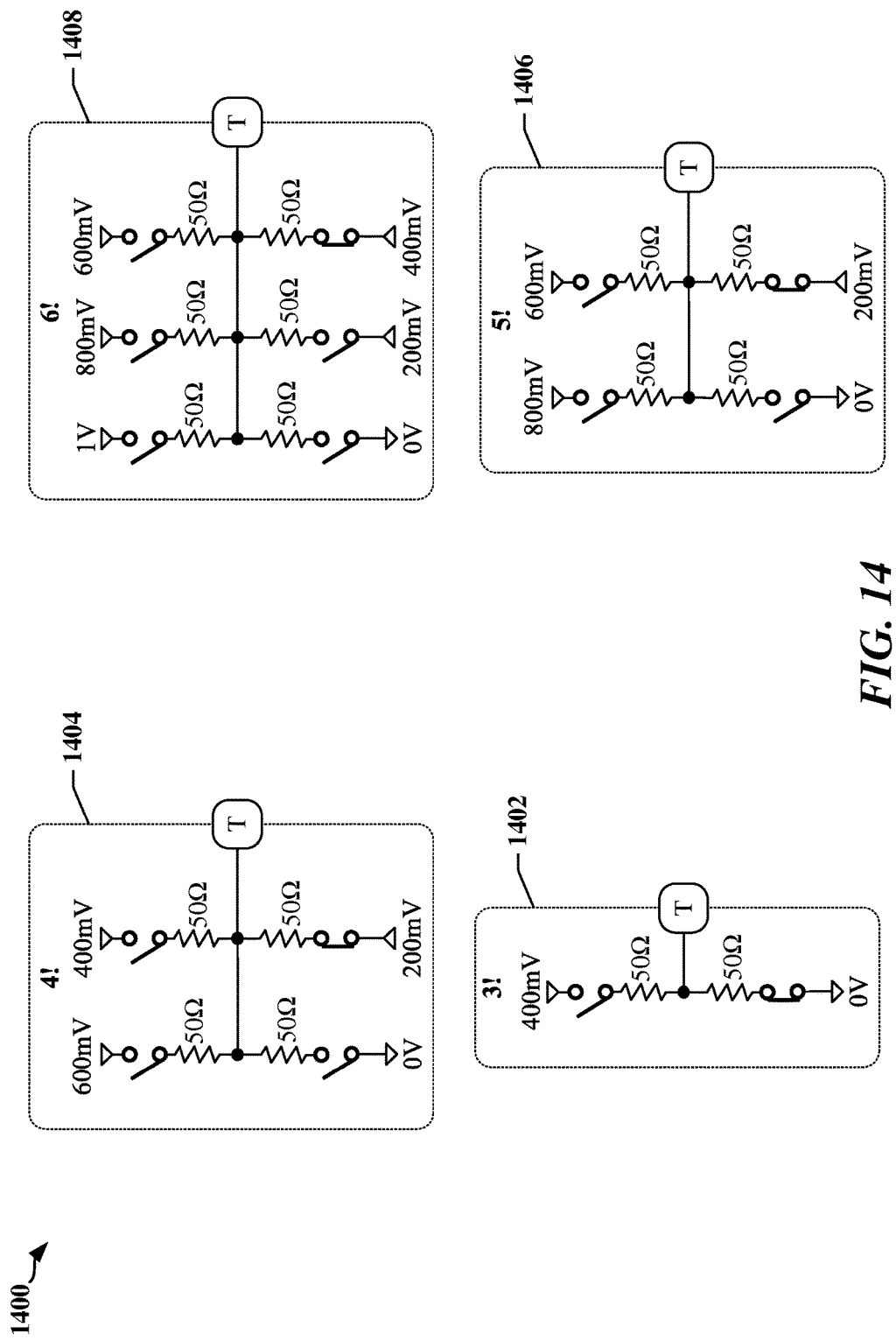
FIG. 14 illustrates examples of voltage mode combination drivers for N! interfaces implemented with various numbers of connectors.

FIG. 14 shows examples of combination drivers 1402, 1404, 1406 and 1408 that may be used in N! interface having varying numbers of wires. A 3! combination driver 1402 can switch between two voltage levels, which are 0V and 400 mV in the example. A 4! combination driver 1404 can switch between four voltage levels, as described in relation to FIGS. 11, 12 and 13. A 5! combination driver 1406 can also switch between four voltage levels, but uses a different set of voltages than the 4! combination driver 1404. In the depicted example, the 5! combination driver 1406 switches between 0V, 200 mV, 600 mV and 800 mV. A 6! combination driver 1408 can switch between six voltage levels, which may include 0V, 200 mV, 400 mV, 600 mV, 800 mV and 1V in order to emulate current flows associated with 15 ($_6C_2$) differential line drivers.

Figure 15:
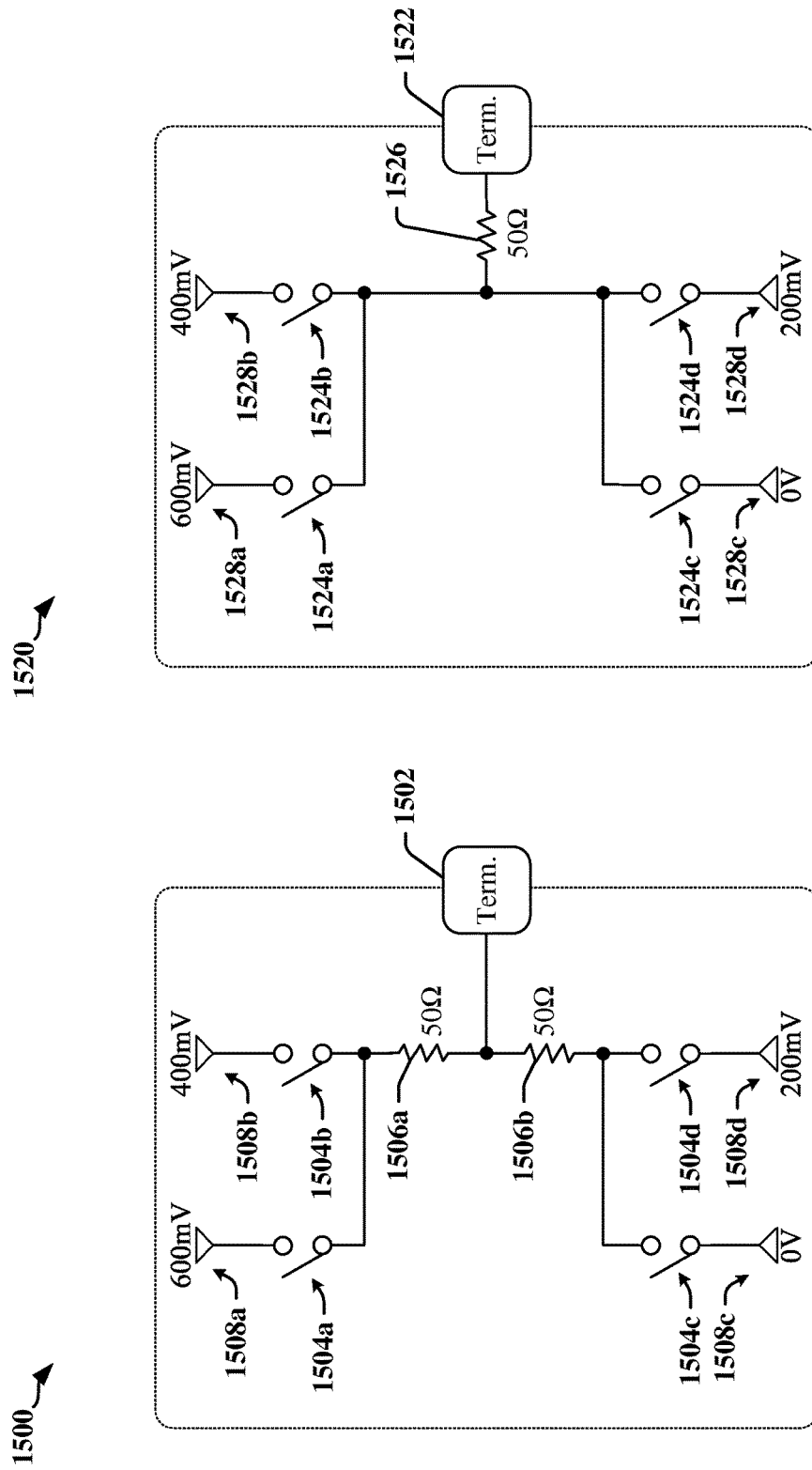
FIG. 15 illustrates alternative configurations of voltage mode combination drivers according to certain aspects disclosed herein.

FIG. 15 is schematic diagram illustrating alternative configurations of voltage mode combination drivers 1500 and 1520. The voltage mode combination drivers 1500, 1520 may be adapted to drive a terminal 1502 or 1522 coupled to a wire of an N! interface. In this regard, the voltage mode combination drivers 1500, 1520 may replace, or be substituted for the combination driver 1000 in FIG. 10, for example. The drivers 1500, 1520 are implemented with fewer resistive elements and can provide flexibility in circuit design in addition to requiring less real estate on an integrated circuit, chip-carrier, circuit board, or the like. The voltage mode combination drivers 1500, 1520 provide a variable current flow through the terminal 1502 or 1522 while maintaining a constant output impedance.

The voltage mode combination driver 1500 includes first switches 1504$a$, 1504$b$ that are adapted to couple the terminal 1502 to one of two voltage sources 1508$a$ and 1508$b$ through a first common resistor 1506$a$, and second switches 1504$c$, 1504$d$ that are adapted to couple the terminal 1502 to one of two other voltage sources 1508$c$ and 1508$d$ through a second common resistor 1506$b$. The assignment of voltage source 1508$a$-1508$d$ to resistors 1506$a$, 1506$b$, and the number of resistors used may be selected based on circuit configuration, voltage levels or tolerances and/or timing tolerances. For each possible signaling state, only one of the switches is closed, thereby ensuring that a constant output impedance can be maintained for the voltage mode combination driver 1500. In one example, the voltage sources 1508$a$-1508$d$ have voltage levels that range between 0 volts and 600 millivolts, in 200 millivolt steps.

The voltage mode combination driver 1520 includes four switches 1524$a$, 1524$b$, 1524$c$, and 1524$d$ that are adapted to couple the terminal 1522 to one of the voltage sources 1528$a$, 1528$b$, 1528$c$, and 1528$d$ through a common resistor 1526. For each possible signaling state, only one of the switches is closed, and a constant output impedance is provided for the voltage mode combination driver 1520. In one example, the voltage sources 1528$a$-1528$d$ have voltages that range between 0 volts and 600 millivolts, in 200 millivolt steps.

In operation, the timing of the voltage mode combination drivers 1500, 1520 may be controlled to ensure that no direct connection is provided between voltage sources 1508$a$ and 1508$b$, voltage sources 1508$c$ and 1508$d$, or between any two of voltage sources 1528$a$, 1528$b$, 1528$c$ and 1528$d$ during transitions or at other times due to the operation of the switches 1504$a$-1504$d$ or 1524$a$-1524$d$.

Figure 16:
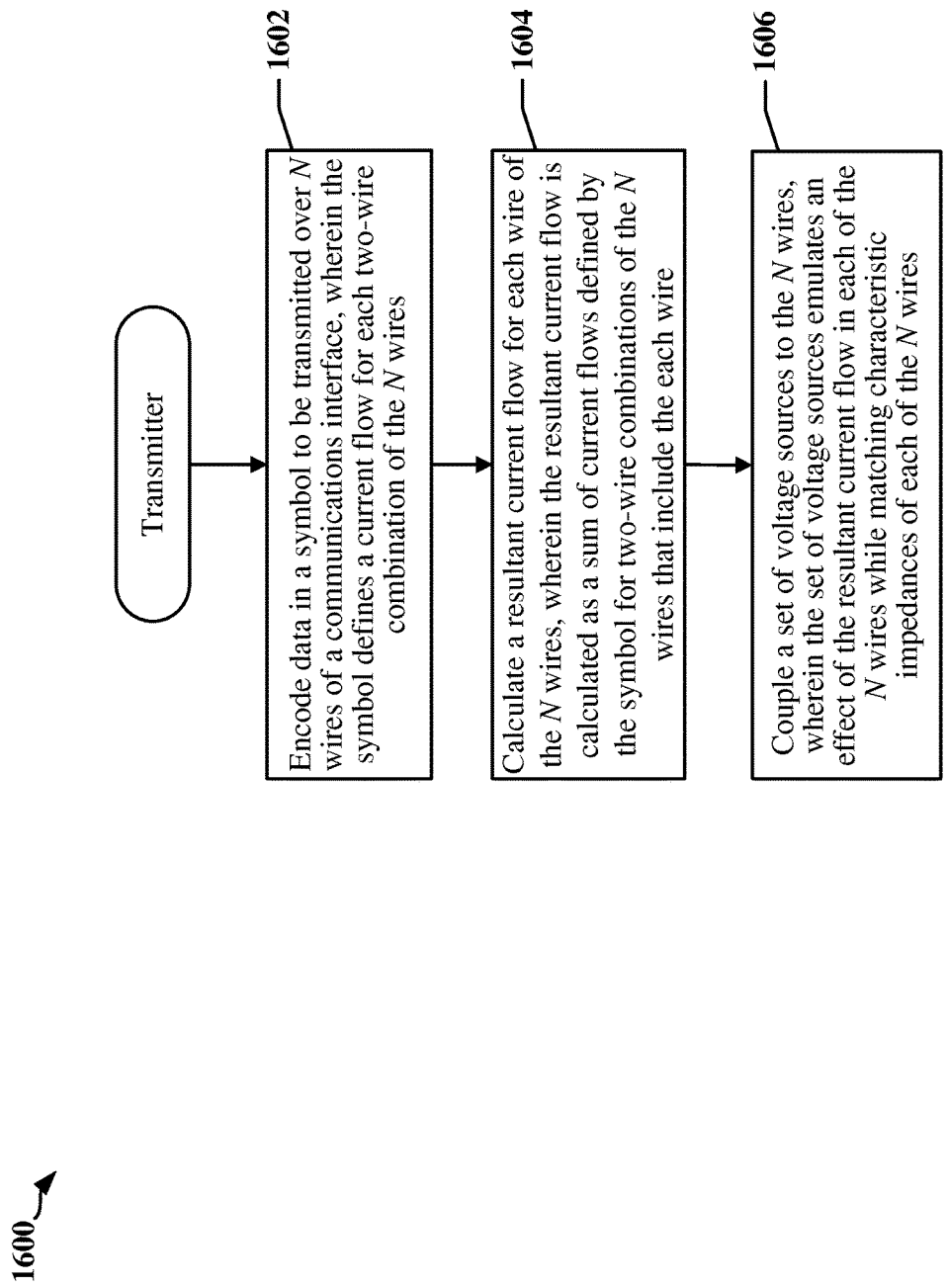
FIG. 16 is a flow chart of a first method for transmitting additional data on an I2C bus according to one or more aspects disclosed herein.

FIG. 16 includes a flowchart 1600 illustrating a method for data communications on an N! interface. At step 1602, a transmitting device may encode data in a symbol to be transmitted over N wires of a communications interface. The symbol may define a current flow for each two-wire combination of the N wires.

At step 1604, the device may calculate a resultant current flow for each wire of the N wires. The resultant current flow may be calculated as a sum of current flows defined by the symbol for two-wire combinations of the N wires that include the each wire.

At step 1606, the device may couple a set of voltage sources to the N wires. The set of voltage sources may emulate an effect of the resultant current flow in each of the N wires while matching characteristic impedances of each of the N wires.

In one example, each wire of the N wires is coupled by a terminating impedance to a center-point in a termination network. The set of voltage sources may be selected such that resultant currents in the N wires cancel at the center-point in the termination network. Each wire of the N wires may be coupled to a single voltage source through an impedance that matches the terminating impedance.

In another example, The set of voltage sources may be coupled to the N wires by activating a switch that connects each wire to a voltage source that has a voltage level operable to produce the resultant current calculated for the wire. A plurality of voltage sources may be available for connection to each wire. Each of the plurality of voltage sources may have a voltage level different from the other voltage sources in the plurality of voltage sources.

A bit in the symbol may define a direction of current flow in each two-wire combination. The current flow in each two-wire combination flows in opposite directions in first and second wires of the each two-wire combination. The current flow in each two-wire combination may be equivalent to a differential current flow produced by a differential line driver coupled to the each two-wire combination. Each wire may be included in N−1 two-wire combinations. The symbol may define $_NC_2$ current flows.

Figure 17:
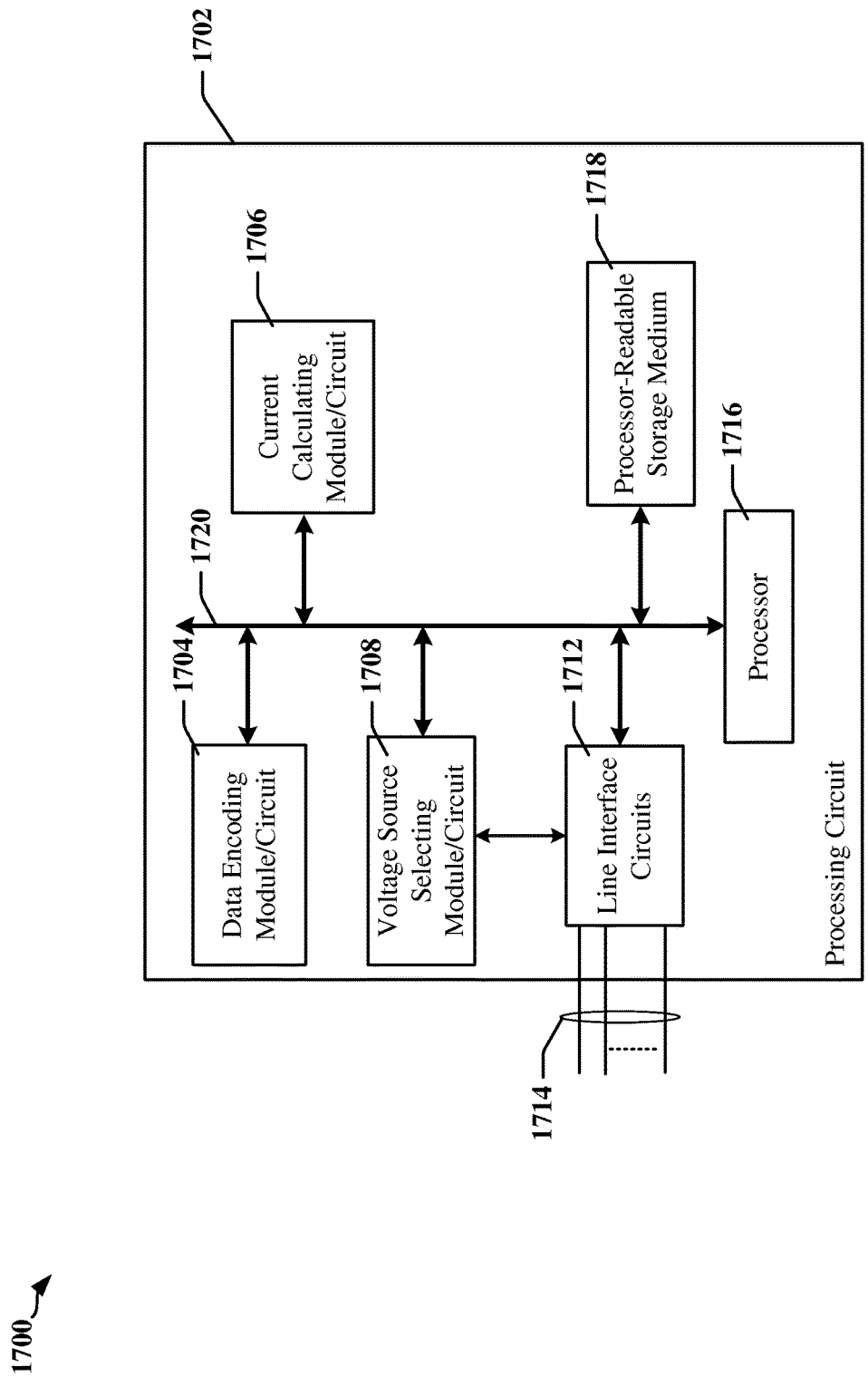
FIG. 17 is a diagram illustrating an example of a hardware implementation for an apparatus that provides and/or operates one or more N! voltage mode drivers in accordance with one or more aspects disclosed herein

FIG. 17 is a diagram illustrating a simplified example of a hardware implementation for an apparatus 1700 employing a processing circuit 1702. The processing circuit typically has a processor 1716 that may include one or more of a microprocessor, microcontroller, digital signal processor, a sequencer and a state machine, or the like. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706 and 1708, line interface circuits 1712 configurable to communicate aver a communications interface 1714 that includes a number (N) of connectors or wires, and the computer-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the computer-readable storage medium 1718. The software, when executed by the processor 1716, causes the processing circuit 1702 to perform the various functions described supra for any particular apparatus. The computer-readable storage medium 1718 may also be used for storing data that is manipulated by the processor 1716 when executing software, including data decoded from symbols transmitted over the communications interface 1714. The processing circuit 1702 further includes at least one of the modules 1704, 1706 and 1708. The modules 1704, 1706 and 1708 may be software modules running in the processor 1716, resident/stored in the computer-readable storage medium 1718, one or more hardware modules coupled to the processor 1716, or some combination thereof. The modules 1704, 1706 and 1708 may include microcontroller instructions, state machine configuration parameters, or some combination thereof.

In one configuration, the apparatus 1700 includes a module and/or circuit 1704 that is configured to encode data in a symbol to be transmitted over the N wires of the communications interface 1714, a module and/or circuit 1706 that is configured to calculate a resultant current flow for each wire of the N wires of the communications interface 1714, and a module and/or circuit 1708 that is configured to couple a set of voltage sources to the N wires of the communications interface 1714.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
    encoding data in a symbol to be transmitted over N wires of a communications interface, wherein the symbol defines a current flow for each two-wire combination of the N wires;
    calculating a resultant current flow for each wire of the N wires, wherein the resultant current flow is calculated as a sum of current flows defined by the symbol for two-wire combinations of the N wires that include the each wire; and
    coupling a set of voltage sources to the N wires, wherein the set of voltage sources emulates an effect of the resultant current flow in each of the N wires while matching characteristic impedances of each of the N wires, and
    wherein each wire of the N wires is coupled to a single voltage source through an impedance that matches the terminating impedance.

2. The method of claim 1, wherein each wire of the N wires is coupled by a terminating impedance to a center-point in a termination network, and wherein the set of voltage sources is selected such that resultant currents in the N wires cancel at the center-point in the termination network.

3. The method of claim 1, wherein for each wire of the N wires, coupling the set of voltage sources to the N wires includes:
    activating a switch that connects the each wire to a voltage source that has a voltage level operable to produce the resultant current calculated for the each wire,
    wherein a plurality of voltage sources is available for connection to the each wire, and wherein each of the plurality of voltage sources has a voltage level different from the other voltage sources in the plurality of voltage sources.

4. The method of claim 1, wherein a bit in the symbol defines a direction of the current flow for the each two-wire combination, and wherein the current flow for the each two-wire combination flows in opposite directions in first and second wires of the each two-wire combination.

5. The method of claim 1, wherein the current flow for the each two-wire combination is equivalent to a differential current flow produced by a differential line driver coupled to the each two-wire combination.

6. The method of claim 1, wherein each wire is included in N−1 two-wire combinations.

7. The method of claim 1, wherein the symbol defines a number of current flows calculated as the number of different wire pairs in the N wires.

8. An apparatus configured to transmit data on an N-factorial (N!) interface, comprising:
    a plurality of voltage sources;
    a plurality of switches, each switch operable to couple a corresponding one of the plurality of voltage sources through a resistor to one of N wires in the N! interface; and
    control logic configured to:
        calculate a resultant current flow for each wire of the N wires, wherein the resultant current flow is calculated as a sum of current flows defined by a symbol for each two-wire combination of the N wires that includes the each wire; and
        activate N switches such that one voltage source is coupled to each of the N wires, wherein a set of voltage sources is selected for coupling to the N wires such that an effect of the resultant current flow in each of the N wires is emulated,
    wherein each wire of the N wires is coupled to a single voltage source through an impedance that matches the terminating impedance, and
    wherein the symbol encodes data to be transmitted over the N! interface in a combination of current flows provided in two-wire combinations of the N wires.

9. The apparatus of claim 8, wherein each wire of the N wires is coupled by a terminating impedance to a center-point in a termination network, and wherein the set of voltage sources is selected such that resultant currents in the N wires cancel at the center-point in the termination network.

10. The apparatus of claim 8, wherein a plurality of voltage sources is available for connection to each of the N wires, and wherein each of the plurality of voltage sources has a voltage level different from the other voltage sources in the plurality of voltage sources.

11. The apparatus of claim 8, wherein a bit in the symbol defines a direction of the current flow for the each two-wire combination, and wherein the current flow for the each two-wire combination flows in opposite directions in first and second wires of the each two-wire combination.

12. The apparatus of claim 8, wherein the current flow for the each two-wire combination is equivalent to a differential current flow produced by a differential line driver coupled to the each two-wire combination.

13. The apparatus of claim 8, wherein each wire is included in N−1 two-wire combinations.

14. The apparatus of claim 8, wherein the symbol defines a number of current flows calculated as the number of different wire pairs in the N wires.

15. An apparatus, comprising:
    means for encoding data in a symbol to be transmitted over N wires of a communications interface, wherein the symbol defines a current flow for each two-wire combination of the N wires; and
    means for coupling a set of voltage sources to the N wires, wherein the set of voltage sources emulates an effect of a resultant current flow in each of the N wires, wherein the resultant current flow is calculable as a sum of current flows defined by the symbol for two-wire combinations of the N wires that include the each wire,
    wherein characteristic impedances of each of the N wires is matched when the set of voltage sources is coupled to the N wires, and
    wherein each wire of the N wires is coupled to a single voltage source through an impedance that matches the terminating impedance.

16. The apparatus of claim 15, wherein each wire of the N wires is coupled by a terminating impedance to a center-point in a termination network, and wherein the set of voltage sources is selected such that resultant currents in the N wires cancel at the center-point in the termination network.

17. The apparatus of claim 15, wherein for each wire of the N wires, coupling the set of voltage sources to the N wires includes:
    activating a switch that connects the each wire to a voltage source that has a voltage level operable to produce the resultant current in the each wire,
    wherein a plurality of voltage sources is available for connection to the each wire, and wherein each of the plurality of voltage sources has a voltage level different from the other voltage sources in the plurality of voltage sources.

18. The apparatus of claim 15, wherein a bit in the symbol defines a direction of the current flow for the each two-wire combination, and wherein the current flow for the each two-wire combination flows in opposite directions in first and second wires of the each two-wire combination.

19. The apparatus of claim 15, wherein the current flow for the each two-wire combination is equivalent to a differential current flow produced by a differential line driver coupled to the each two-wire combination.

20. The apparatus of claim 15, wherein the symbol defines a number of current flows calculated as the number of different wire pairs in the N wires, and wherein each wire is included in N−1 two-wire combinations.

21. A non-transitory processor-readable storage medium having one or more instructions which, when executed by at least one processing circuit, cause the at least one processing circuit to:
    encode data in a symbol to be transmitted over N wires of a communications interface, wherein the symbol defines a current flow for each two-wire combination of the N wires;
    calculate a resultant current flow for each wire of the N wires, wherein the resultant current flow is calculated as a sum of current flows defined by the symbol for two-wire combinations of the N wires that include the each wire; and
    couple a set of voltage sources to the N wires, wherein the set of voltage sources emulates an effect of the resultant current flow in each of the N wires while matching characteristic impedances of each of the N wires, and
    wherein each wire of the N wires is coupled to a single voltage source through an impedance that matches the terminating impedance.

22. The processor-readable storage medium of claim 21, wherein each wire of the N wires is coupled by a terminating impedance to a center-point in a termination network, and wherein the set of voltage sources is selected such that resultant currents in the N wires cancel at the center-point in the termination network.

23. The processor-readable storage medium of claim 21, wherein for each wire of the N wires, the instructions cause the at least one processing circuit to:
    activate a switch that connects the each wire to a voltage source that has a voltage level operable to produce the resultant current calculated for the each wire,
    wherein a plurality of voltage sources is available for connection to the each wire, and wherein each of the plurality of voltage sources has a voltage level different from the other voltage sources in the plurality of voltage sources.

24. The processor-readable storage medium of claim 21, wherein a bit in the symbol defines a direction of the current flow for the each two-wire combination, and wherein the current flow for the each two-wire combination flows in opposite directions in first and second wires of the each two-wire combination.

25. The processor-readable storage medium of claim 21, wherein the current flow for the each two-wire combination is equivalent to a differential current flow produced by a differential line driver coupled to the each two-wire combination.

26. The processor-readable storage medium of claim 21, wherein the symbol defines a number of current flows calculated as the number of different wire pairs in the N wires, and wherein each wire is included in N−1 two-wire combinations.

* * * * *